(12) United States Patent
Connell et al.

(10) Patent No.: US 11,164,133 B2
(45) Date of Patent: Nov. 2, 2021

(54) SYSTEM AND METHOD FOR A SUPPLIER RISK INDEX

(71) Applicant: JPMorgan Chase Bank, N.A., New York, NY (US)

(72) Inventors: Jim Connell, New York, NY (US); Dolly K. Singh, New York, NY (US); Stephanie Sharp, Dublin, OH (US); Chandrashekar D. Kasibhatta, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 108 days.

(21) Appl. No.: 16/542,820

(22) Filed: Aug. 16, 2019

(65) Prior Publication Data

US 2020/0065727 A1 Feb. 27, 2020

Related U.S. Application Data

(60) Provisional application No. 62/721,001, filed on Aug. 22, 2018.

(51) Int. Cl.
*G06Q 10/06* (2012.01)
*G06Q 10/08* (2012.01)

(52) U.S. Cl.
CPC ... *G06Q 10/0635* (2013.01); *G06Q 10/06375* (2013.01); *G06Q 10/087* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 7,698,148 | B2 * | 4/2010 | Lavu ................... G06Q 10/0635 |
| | | | 705/1.1 |
| 10,643,165 | B2 * | 5/2020 | Vashistha ............... G06Q 10/08 |
| 2005/0021360 | A1 * | 1/2005 | Miller .................... G06Q 10/08 |
| | | | 705/7.28 |
| 2005/0197952 | A1 * | 9/2005 | Shea ..................... G06Q 40/08 |
| | | | 705/38 |
| 2007/0203912 | A1 * | 8/2007 | Thuve .................. G06F 16/9024 |
| 2008/0140514 | A1 * | 6/2008 | Stenger .................. G06Q 40/06 |
| | | | 705/7.28 |

(Continued)

OTHER PUBLICATIONS

Blackhurst, Jennifer, "Supplier risk assessment and monitoring for the automotive industry", International Journal of Physical Distribution & Logistics Management, vol. 38, No. 2, 2008, pp. 143-165. (Year: 2008).*

(Continued)

*Primary Examiner* — Alan S Miller
(74) *Attorney, Agent, or Firm* — Greenblum & Bernstein, P.L.C.

(57) ABSTRACT

A method of determining a supplier risk index (SRI) for a supplier. The method includes: determining an inherent risk rating of the supplier based on risk attributes of the supplier; performing a control assessment of the supplier to determine a control assessment result; quantifying other risk attributes; and calculating the SRI, by a processor, based on the inherent risk rating, the assessment result, and the other risk attributes in order for an organization to make better informed supplier selection decisions and reduce supplier risk.

17 Claims, 23 Drawing Sheets

(56) References Cited

U.S. PATENT DOCUMENTS

| | | | |
|---|---|---|---|
| 2010/0198630 A1* | 8/2010 | Page | G06Q 10/0635 705/7.28 |
| 2013/0211872 A1* | 8/2013 | Cherry | G06Q 10/0635 705/7.28 |
| 2014/0019295 A1* | 1/2014 | Brownley | G06Q 30/0631 705/26.7 |
| 2014/0122163 A1* | 5/2014 | Simpson | G06Q 10/067 705/7.28 |
| 2015/0186814 A1* | 7/2015 | Ng | G06Q 10/0635 705/7.28 |
| 2015/0242776 A1* | 8/2015 | Wilcox | G06Q 10/0635 705/7.28 |
| 2017/0161643 A1* | 6/2017 | Hoover | G06F 16/25 |
| 2017/0193411 A1* | 7/2017 | Vashistha | G06Q 10/0635 |
| 2018/0068244 A1* | 3/2018 | Vashistha | G06Q 10/0635 |
| 2018/0191768 A1* | 7/2018 | Broda | H04L 63/1425 |
| 2019/0266533 A1* | 8/2019 | Harris | G06Q 10/06315 |

OTHER PUBLICATIONS

International Search Report in counterpart International Application No. PCT/US2019/047498, dated Nov. 5, 2019.
Written Opinion in counterpart International Application No. PCT/US2019/047498, dated Nov. 5, 2019.

\* cited by examiner

| # | User Story | Acceptance Criteria | JIRA Story | Notes |
|---|---|---|---|---|
| 1 | SRI algorithm | Parameters that should go in to the SRI algorithm are as below.<br><br>1. Dynamic CE<br>2. ACA Score<br>3. Performance Score<br>4. Exposed Risk Accepts<br>5. Vulnerability<br>6. Incident<br>7. Breach<br>8. Data Loss<br>9. Over Due Action Plans<br>10. Over due Remedies | <All stories mentioned below> | |
| 2 | SRI for positive Contributors | • Step-1: If there is a Performance score, then Weight for Performance score = 10%.; Performance score contribution = (Weight for Performance score/100) * Calculated 100 point scale Performance score; if there is no Performance Score, then Performance score contribution = 0<br>• Step-2: If there is ACA score, then ACA score contribution = (Calculated weight for ACA score/100) * Calculated SRI equivalent ACA score if there is no ACA score, then ACA score contribution = 0<br>• Step-3: Dynamic CE contribution = [(100 - (Weight for Performance score + Weight for ACA score))/100) * Calculated SRI equivalent Dynamic CE score<br>• Step-4: Calculate SRI Score for positive contributors = Performance score contribution + ACA score contribution + Dynamic CE contribution | SRI<br>Algorithm - SRI Score with Positive Contributors only | • If there is no CE score available for assessments tied to the identified engagements then SRI score will not be calculated<br>• If there is ACA score calculated, then Application risk Rating must be used for SRI score calculation. In other words, if Application Risk Rating is calculated for an application, then ACA score must be available for SRI score calculation. |

| # | | | Source | |
|---|---|---|---|---|
| 8 | Cyber Incidents | Cyber Incidents should be fed in to the algorithm based on the Type. | SOURCE: Configuration Table with in Compass<br><br>Step 1: For each engagement, Get the the count of incidents with incident Type= "Cyber incidents" and incident status = "investigation in progress" and "Follow up".<br><br>Step 2: Identify total number of Cyber incidents.<br><br>Step 3: Calculate the final Cyber incident value to be fed in to the SRI algorithm= Total number of Cyber incidents identified in step 1 *100<br><br>Weight applied = 25% | Cyber Incident/Cyber Breach/Data Loss - Count for a supplier |
| 9 | Cyber Breach | Cyber Breaches reported on engagements should be fed in to the algorithm | SOURCE: Configuration Table with in Compass<br><br>Step 1: For each engagement, Get the count of breaches with incident Type="Cyber Breach" and incident Status = "investigation in progress" and "Follow up".<br><br>Step 2: Calculate the Cyber breach value to be fed in to SRI algorithm<br><br>step 3 - Final Cyber Breach value with weights applied= total number of cyber breach incidents *100<br><br>Weight to be applied = 50% | Cyber Incident/Cyber Breach/Data Loss - Count for a supplier |
| 10 | Data Loss | Data Loss information should be fed in to the algorithm | SOURCE: Configuration Table with in Compass<br><br>Step 1: For each engagement, Get the the number of Data loss incidents with incident Type= "Data Loss" and incident Status = "investigation in progress" and "Follow up".<br><br>Step 2: Calculate the Data Loss value to be fed in to SRI algorithm.<br><br>Data Loss = Total number of Data Loss incidents identified in step 1 *100<br><br>Weight to be applied = 100% | Cyber Incident/Cyber Breach/Data Loss - Count for a supplier |

FIG. 18E

| | Action Plan Delays from 4 laks should be considered for SRI calculation | SOURCE - Reporting<br>step1 - based on the severity, identify the Action plans with Action Plan Mile stone Status of Action Plan sent to supplier" and supplier Action Plan date is past due.<br><br>Step 2 - Get the total count of all those action plans with the above criteria for all pits associated to identified profiles<br><br>Step 3- Overdue Action Plans =Total number of action plans identified *20<br><br>Step 4- based on the severity identify the range of number of days overdue for each action plan using Overdue Penalty Weight Calculator and feed the Negative Contributor Factor.<br><br>If there are multiple AP over dues, Calculate the negative contributor factor for each and take the average.<br><br>Step 5-Multiply negative Contributor factor * value identified in step 3.<br><br>step 6- Final SRI score =(sum of positive contributors with weights applied) - (value obtained in step 5) | Action Plans<br>- Severity and Overdue days for a supplier<br><br>SRI<br>Algorithm - Action Plan : Calculate Overdue Penalty Weight |
|---|---|---|---|
| 12 | Application Break Remediation Delays should be calculated for each Break associated to an application tied to an engagement | SOURCE for ACA data - Reporting<br>For each applications associated to the engagement,<br><br>Step 1- based on the severity, identify the number of records with break status=Open and Remedy Action Type="Fix"<br><br>Step 2 - Get the TARGET COMPLETION DT<br><br>Step 3 - Get the count of applications breaks(fixes) for which TARGET COMPLETION DT is past due<br><br>Step 4 - Total overdue Remedy = {<br><br>Total No of overdue remedies identified in step3*20}<br><br>Step 5- For each break, based on the severity identify the number of days overdue<br><br>step 6- For each overdue, find the Negative Contributor factor using the Overdue Penalty Weight Calculator.<br><br>If there are multiple Overdue remedies, take the average of the calculated negative contributor Factor.<br><br>Step 7-(Negative Contributor value)*(Total number of over due remedy calculated in step 4)<br><br>SRI score=Sum of weighted positive contributors - (value identified in Step 7) | Application<br>Break Remediation Delays - Severity and Overdue days for a supplier<br><br>SRI<br>Algorithm - Application Breaks: Calculate Overdue Penalty Weight Closed<br><br>SRI Algorithm for final SRI score and grade:<br><br>SRI<br>Algorithm - Final SRI Score including Negative Contributors<br><br>SRI<br>Algorithm - Grade for SRI Score |

FIG. 18F

SYSTEM AND METHOD FOR A SUPPLIER RISK INDEX

CROSS-REFERENCE TO RELATED APPLICATION

The present application claims the benefit of U.S. Provisional Application No. 62/721,001 filed Aug. 22, 2018, the contents of which are expressly incorporated herein by reference in their entirety.

FIELD OF THE DISCLOSURE

The disclosure relates generally to systems and methods for determining the risk to an organization associated with a supplier and communicating that risk to a user, and more specifically, to communicating that risk using a Supplier Risk Index (SRI).

BACKGROUND OF THE DISCLOSURE

Businesses and other organizations depend on outside sources for goods and services. These sources for goods and services are commonly referred to as suppliers. For example, some business may have over nine thousand suppliers. Utilizing these suppliers introduces risk to the business (or organization), which may be difficult for the business to appreciate or understand and quantify. Some suppliers provide goods and/or services that are less critical to a particular organization (for example, office supplies), while other suppliers might provide goods and/or services that are critical to the organization (for example, cloud computing). Critical suppliers can cause significant problems for an organization should they fail to maintain a reliable level of service (e.g., product quality, quantity, or both). As such, it is important for an organization (e.g., when selecting or reevaluating a potential supplier) to be able to determine the level of risk that a particular supplier may introduce to the business or organization.

Currently, there is no one system or location to review all information pertinent to determining a risk of a potential supplier. As such, when evaluating potential suppliers using existing approaches, the organization (e.g., a delivery manager) must review disparate and scattered information, for example, from multiple systems and via different portals. As such, using current approaches, a supplier risk is difficult to determine and takes significant time to complete. Because significant time is required with current systems, while undertaking a supplier risk analysis for a particular supplier, underlying information impacting the risk analysis may change (e.g., a cyber event may occur for the supplier). However, as such information is not readily available to the decision maker, with current approaches this updated or new information is not captured or taken into account when performing a supplier risk analysis (and the risk analysis is deficient and needs to be performed again.

Additionally, as this information may not have been updated or may change during the review process, even when such information is obtained, with existing approaches, this available information provides only a limited visibility into metrics that might impact a supplier's risk. Additionally, the disparate and scattered information is not dynamically updated, and as such, a user of this information cannot capture Supplier's Control Effectiveness (CE) score/and performance trends, which can have a large impact on risk. Additionally, with existing approaches, there is an imperfect correlation between supplier recommendation and underlying data. Due to the above-noted deficiencies in existing approaches for risk assessment (and comparison of risk assessments for supplier selection), delays are encountered when making such decisions using existing approaches, and consequently, costs are increased for making risk determination decisions.

As such, there is a need in the art for a system and method for determining the risk associated with a supplier and presenting that information to those responsible for selecting suppliers for a particular good and service, which accounts for relevant factors including both supplier characteristics and characteristics of the good and/or service supplied.

SUMMARY OF EMBODIMENTS OF THE DISCLOSURE

Embodiments of the disclosure are directed to a system for and method of determining the risk associated with a supplier and presenting that information to those responsible for selecting suppliers for a particular good and service, which accounts for relevant factors including both supplier characteristics and characteristics of the good and/or service supplied. As embodiments of the present disclosure satisfy a need in the art for a system and method for determining the risk associated with a supplier and presenting that information in real-time to those responsible for selecting suppliers for a particular good and service, that accounts for relevant factors including both supplier characteristics and characteristics of the good and/or service supplied, the embodiments of the present disclosure are a technological contribution over the exiting approaches.

In an exemplary and non-limiting embodiment, a system and method for determining supplier risk may use three key inputs: an inherent risk rating (IRR) of the supplier; a control assessment of the supplier; and a selection of other risk attributes of the supplier. These inputs are utilized (e.g., combined) to produce a supplier risk index (SRI) for the supplier. In accordance with aspects of the disclosure, the SRI represents a holistic, end-to-end view of the risk associated to a supplier. In accordance with aspects of the disclosure, the SRI may be used as an absolute reference, which may be subject to a threshold with suppliers—for example, above a certain predetermined risk, the business or organization may remove the supplier from consideration. In other exemplary embodiments, the SRI may be a relative score, in which potential suppliers for a certain good or service are presented such that their respective SRI scores are displayed. In accordance with further aspects of the disclosure, this SRI comparison of the potential suppliers permits a user (e.g., a delivery manager) to determine which of the suppliers being considered has the lowest score relative to the other suppliers.

By implementing aspects of the disclosure, a system provides an intuitive and comprehensive "one-stop" for reviewing all supplier information in real-time (including a calculated SRI), which represents a technological contribution over existing approaches. The user may utilize deep dive metrics (e.g., key performance indicators (KPI), supplier quality, service level agreements (SLA)), which enables a thorough decision making process, in accordance with aspects of the disclosure. With exemplary embodiments, a GUI can be configured to provide specific views that may cater to different groups.

In embodiments, the supplier information and Risk rating (e.g., SRI) is based on a comprehensive algorithm receiving various data inputs. Additionally, in accordance with aspects of the disclosure, the system receives one or more real-time dynamic feeds to maintain the scoring (e.g., SRI and other presented information) in real-time, and monitors control effectiveness (CE) trends and peer comparisons. The different SRI input data may have different refresh rates (e.g., real-time, hourly, daily, weekly, monthly, annually, etc.). As such, it should be understood that a supplier's SRI score is not a static score, but rather is regularly updated along with other information. In such a manner, the embodiments of the instant disclosure provide synergistic effects based on a weighting of data points, real-time updates (e.g., over 100 updates a day) to review and compare real-time supplier SRI scores (and grades). In such a manner, the embodiments of the present disclosure are a technical contribution over the existing approaches.

By implementing aspects of the disclosure, all of the disparate and scattered information is received from multiple systems and via different portals. Additionally, the information is dynamically updated, and as such, a user of this information can capture the Control Effectiveness score and performance trends. Moreover, by implementing the embodiments of the present disclosure, delays can be avoided or minimized when making supplier decisions. In other words, by implementing embodiments of the present disclosure, the vendor (or supplier) selection process can be streamlined and improved to help a user arrive at a correct supplier decision in a faster, less risky and less expensive manner. Accordingly, the embodiments of the present disclosure are a technical contribution over the existing approaches for determining a supplier's risk to an organization.

In accordance with aspects of the disclosure, the system may identify (and/or highlight) a particular supplier's strong areas versus any concern areas, which assists the user (e.g., delivery manager) in faster supplier decision making incorporating a risk-based approach, which represents a technical contribution over current approaches. Additionally, suppliers may use such information as a feedback (e.g., concern areas and/or positive areas) to improve their services in an effort to improve their SRI. For example, a potential supplier may utilize the SRI determination tool to educate themselves as to how to improve their SRI score. For example, a user can perform a self-assessment to identify those areas where they may be deficient, and use the self-assessment to take actions to correct those deficiencies so as to improve their SRI score.

Additionally, the embodiments of the present disclosure account for cyber events. For example, if a cyber event occurs at a given time of day, the SRI score will be updated (e.g., changed from "A" to "F") in real-time (or near real-time) unless and until the cyber event is sufficiently resolved. As cyber events have not been accounted for in real time with existing approaches, the embodiments of the present disclosure are a technical contribution over the existing approaches.

Embodiments of the disclosure also provide an interface that permit comparison of different suppliers (e.g., for a particular service) in real-time, by reviewing their respective SRI scores, and allows for immediate digging down through the supporting data used to determine the respective SRI scores. In such a manner, the embodiments of the present disclosure are a technical contribution over the existing approaches.

In accordance with additional aspects, embodiments of the disclosure are also operable to perform a trend analysis by reviewing a supplier's (or suppliers') SRI scores (and/or specific attributes and supporting factors) over time.

Aspects of the present disclosure are directed to a method of determining a supplier risk index (SRI) for a supplier. The method includes determining an inherent risk rating of the supplier based on risk attributes of the supplier, performing a control assessment of the supplier to determine a control assessment result, and quantifying other risk attributes. The method also includes calculating, by a processor, the SRI based on the inherent risk rating, the assessment result, and the other risk attributes.

In embodiments of the disclosure, the risk attributes comprise at least one of: a remote access attribute of the supplier; criticality of the service attribute of the supplier; a recovery time objective attribute of the supplier; a personal information/confidential information retention attribute of the supplier; a number of records of the supplier; a supplier-hosted application attribute of the supplier; a consumer/customer contact attribute of the supplier; a regulatory/compliance attribute of the supplier; and a difficulty of replacement attribute for the supplier.

In some embodiments, the control assessment comprises an assessment of a supplier which includes: communications and connectivity controls and protocols of the supplier; a risk management program of the supplier; encryption policies of the supplier; authorization and authentication controls over data of the supplier; data integrity controls of the supplier; application controls of the supplier; business practices, policies, and procedures of the supplier; and management oversight of the supplier.

In additional embodiments, the other risk attributes at the supplier comprise at least one of: a financial viability assessment (FVA) of the supplier; any negative news affecting the supplier; a concentration of risk associated to supplier service category; a performance rating of the supplier; a vulnerability impact assessment result of the supplier; and a reporting of cyber incidents of the supplier.

In yet further embodiments, the calculating the SRI comprises summing weighted positive contributors determined from the inherent risk rating and the control assessment result, and subtracting a product of a negative contributor value and a total number of overdue remedies, which are determined from the other risk attributes.

In embodiments of the disclosure, the method further comprises receiving updated information for at least one of: inherent risk rating of additional supplier engagements, the control assessment of the supplier, and other risk attributes, and updating the SRI based on the updated information in real-time.

In some embodiments, the method further comprises displaying the SRI along with additional supplier information in a supplier selection interface.

In additional embodiments, the displaying the SRI along with additional supplier information in a supplier selection interface comprises using a grading convention and color scheme based on the grading convention.

In yet further embodiments, the SRI is calculated as a numerical score.

Aspects of the present disclosure are directed to a computing apparatus configured to implement an execution of a method for providing a real-time supplier risk index (SRI) and supplier selection criteria of at least one supplier in order to determine risk to an organization resulting from selection of the supplier. The computing apparatus comprises a processor; a memory; a display; and a communication interface coupled to each of the processor and the memory. The processor is configured to: receive quantifications of risk attributes of the supplier, and determine the supplier's inherent risk rating based on the risk attributes of the supplier; receive quantifications of a control assessment result based on a performed control assessment of the supplier; receive quantifications of the other risk attributes; calculate the SRI based on the inherent risk rating, the assessment result, and the other risk attributes. The display is operable to provide a user interface displaying an SRI dashboard for the supplier indicating the SRI of the supplier in real-time.

In embodiments of the disclosure, the user interface additionally displays real-time control effectiveness information of the supplier based on the quantifications of a control assessment result.

In embodiments, the control effectiveness information includes a details selector for immediately displaying underlying supplier data used to determine the control assessment result.

In additional embodiments, the user interface additionally displays real-time performance information of the supplier based on historical performance data of the supplier.

In yet further embodiments, the control effectiveness information includes a detail selector for immediately displaying underlying supplier data used to determine the performance information.

In embodiments of the disclosure, the user interface additionally displays real-time cyber risk information of the supplier.

In further embodiments, wherein the cyber risk information includes a detail selector for immediately displaying underlying data used to determine the cyber risk information.

In additional embodiments, the user interface displays a supplier SRI score along with additional supplier information for each of a plurality of suppliers for comparison of risk between the plurality of suppliers.

In yet further embodiments, the user interface is a real-time dashboard for a supplier that indicates key supplier metrics.

In additional embodiments, the user interface additionally displays supplier contact information and management program membership information for the supplier.

Aspects of the present disclosure are directed to a computing apparatus configured to implement an execution of a method for selecting a supplier based on real-time supplier risk index (SRI) and supplier selection criteria of at least one supplier. The computing apparatus comprises a processor; a memory; and a communication interface coupled to each of the processor and the memory. The processor is configured to: provide a user interface having a SRI dashboard for the supplier indicating the real-time SRI of the supplier and having a supplier selector for selecting the supplier, and wherein the processor is further operable to receive a user selection of the supplier via the supplier selector. The SRI is determined based on: received quantifications of a supplier's risk attributes; received quantifications of a control assessment result of the supplier; and received quantifications of other risk attributes of the supplier.

The above and other aspects and advantages of the disclosure will become more readily apparent from the following description and figures, illustrating by way of example the principles of the general inventive concepts.

BRIEF DESCRIPTION OF THE DRAWINGS

These and other features of the general inventive concept will become better understood with regard to the following description and accompanying drawings in which:

FIGS. 18A-18F depict an exemplary algorithm for determining an SRI in accordance with aspects of the embodiments described herein.

DETAILED DESCRIPTION OF THE EMBODIMENTS OF THE DISCLOSURE

Figure 1:
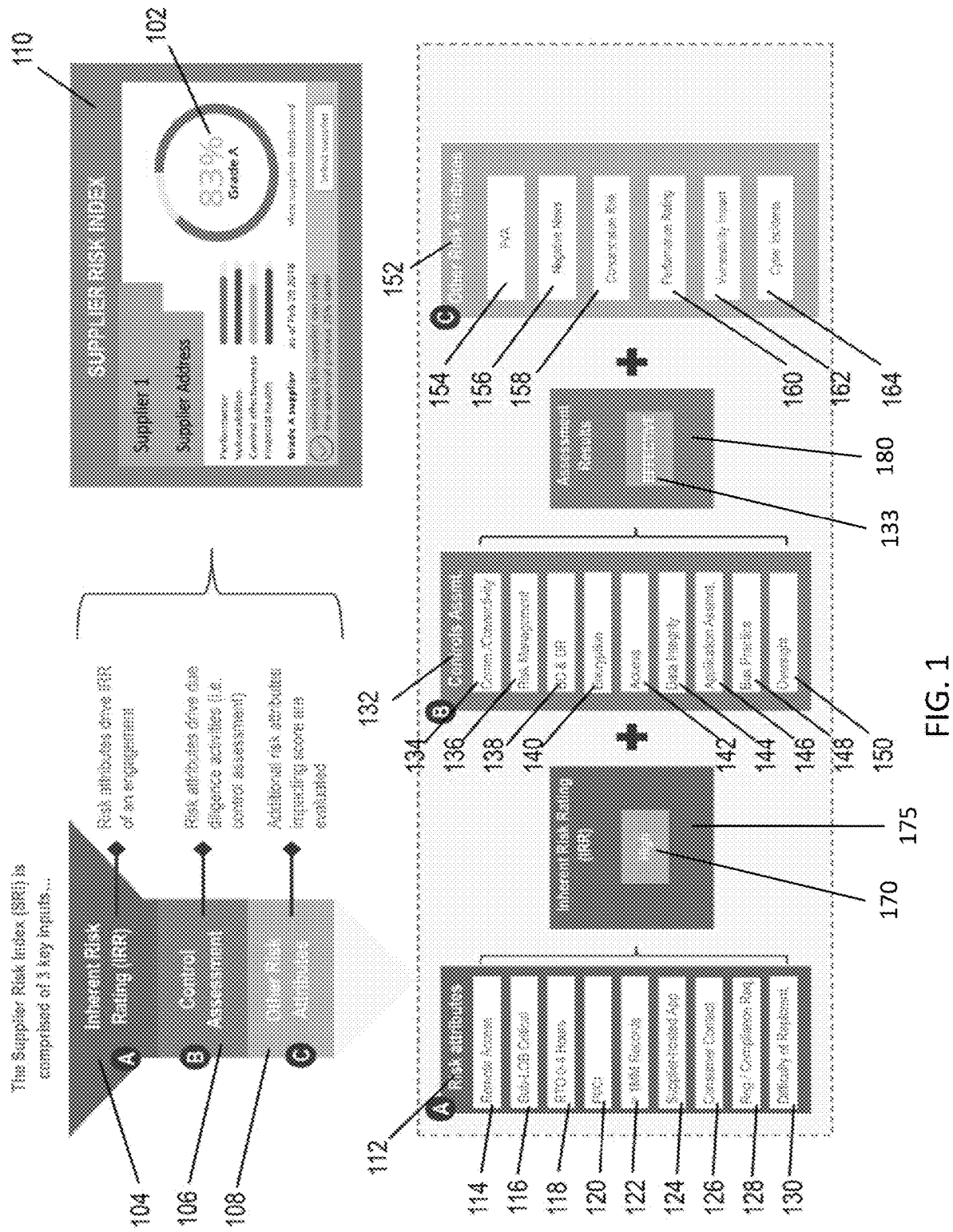
FIG. 1 shows key inputs and components of a supplier risk index (SRI) according to an exemplary embodiment in accordance with aspects of the disclosure.

This detailed description merely describes exemplary embodiments of the disclosure and is not intended to limit the scope of the disclosure in any way. Indeed, the contemplated disclosure is broader than the exemplary embodiments. The terms used in any future claims have their full ordinary meaning unless an express definition is provided herein.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

FIG. 1 shows key inputs and components of a supplier risk index (SRI) according to an exemplary embodiment in accordance with aspects of the disclosure. As is illustrated in FIG. 1, in an exemplary embodiment, a supplier risk index 102 (SRI) is determined. As shown, in some exemplary embodiments, the SRI 102 may be based on three inputs. The first input is an inherent risk rating (IRR) 104 of the supplier. The second input is a control assessment 106 of the supplier. The third input is a combination of additional supplier risk attributes 108 of the supplier. In accordance with aspects of the disclosure, these three inputs are utilized (e.g., combined) to determine (e.g., calculate) the SRI 102, which, in embodiments, is displayed in an exemplary user interface SRI summary 110.

As shown in FIG. 1, the IRR 104 is driven by risk attributes 112 of the supplier. Thus, in accordance with aspects of the disclosure, the IRR 104 portion of the SRI 102 is determined by gathering risk attributes 112 that are characteristic of the nature of the engagement/transaction with the supplier being rated. In the illustrated exemplary embodiment, these risk attributes 112 may include remote access 114, sub-Line Of Business (LOB) critical 116, recovery time objective (RTO) 118, personal/confidential information (PI/CI) 120, volume of data records 122, supplier hosted applications 124, consumer/customer contacts by supplier 126, regulatory/compliance requirements 128, and/or difficulty of replacement 130.

With an exemplary embodiment, the SRI 102 may be determined using a weighted average-based algorithm with a 100-point scale for each contributing input. Event-based triggers are factored in the algorithm and degree of such events is based on severity scales. In embodiments, timeline-based inputs may function as a penalty or credit to the SRI 102 according to whether the actions reflected in the input fall short or exceed timeline metrics according to standards established by the organization.

The remote access 114 risk attribute reflects that the supplier provides a service that has a remote access component. This remote accessibility could result in a higher risk of attack or intrusion by malicious entities that are able to conduct that attack or intrusion attempt via the remote accessibly component.

The sub-LOB critical 116 attribute reflects the criticality of the product or service provided by the supplier. For example, if a service provided by the supplier is critical to a particular line of business (LOB) of the organization, the sub-LOB critical 116 attribute indicates an increased risk to the LOB, and therefore likely will result in higher level of risk to a consumer of that supplier's services. In contrast, if a service provided by the supplier is not critical to a particular line of business (LOB) of the organization, the sub-LOB critical 116 attribute may not indicate an increased risk to the LOB, and therefore likely will result in lower level of risk to a consumer of that supplier's services.

The recovery time objective 118 (RTO) attribute indicates how soon the supplier's services must be restored after a disruption. Any disruption longer than this period of time (e.g., 4 hours) would have a material impact on a supported Business Process.

Suppliers that retain personal information or confidential information (PI/CI) may result in an increased level of risk, as those suppliers are often the targets of attacks that attempt to steal the personal or confidential information retained by the supplier. Thus, the risk attribute for personal information or confidential information 120 (PI/CI) is a measure (or quantification) of the amount of personal/confidential information stored by the supplier, and thus potentially at risk in an attack against that supplier.

The number of records 122 held by the supplier also impacts the risk presented to a consumer of the supplier's products or services. That is, if a supplier maintains a large number of records, the number of records 122 attribute indicates an increased risk, and therefore likely will result in higher level of risk to a consumer of that supplier's services.

The supplier-hosted application 124 attribute reflects the additional risk presented by an application that is hosted by the supplier (as opposed to the organization). If a supplier hosts applications, the supplier-hosted application 124 attribute indicates an increased risk, and therefore likely will result in higher level of risk to a consumer of that supplier's services.

The consumer/customer contact 126 attribute is related to an organization's customers who directly access this product or service provided by supplier. The consumer/customer contact 126 includes application or infrastructure associated with provided services that are accessible to external parties or customers (e.g., the service is available to external customers, or the related application is available through the internet). Services in this category include, for example, call centers that provide support to an organization's customers. A higher level of contact between the consumer and the supplier may result in a higher risk to an organization (and thus, a higher SRI).

Additionally, suppliers with high levels of regulatory and/or compliance requirements 128 may result in an increased level of risk in consideration of those requirements. As also illustrated in FIG. 1, difficulty of replacement 130 is accounted for in the IRR 104. Difficulty of replacement 130 addresses the level of difficulty that would be faced by an organization if that organization wished to replace a current supplier of a product or service. For example, if the product or service was such that changes to the organization's infrastructure were required in order to use a different supplier's good or service, the difficulty of replacement attribute would be high. As shown in FIG. 1, with such an exemplary combination of risk attributes 112 listed in column A, the overall IRR result 170, e.g., "High," may be indicated in an IRR result region 175.

As shown in FIG. 1, the SRI 102 is determined also based upon controls assessments 132, which may be obtained in certain embodiments. The control assessments 132 include risk attributes driven by diligence activities. In certain exemplary embodiments, these controls assessments 132 may include communication/connectivity 134, risk management 136, business continuity (BC) and disaster recovery (DR) 138, encryption 140, access 142, data integrity 144, application assessment 146 (which is similar to the controls assessments 132 but focused on application controls in cases of application use), business practice 148, and oversight 150 along with other control categories. In accordance with aspects of the disclosure, assessing and quantifying these controls assessments enable appropriate due diligence to help prevent loss of confidentiality, integrity and/or availability of information or operations affecting the firm and organization's clients.

In order to obtain controls assessment information, exemplary embodiments provide for rating of controls in place at a supplier. For example, in certain exemplary embodiments, a survey may be conducted that covers, for example, twenty-seven categories of controls and includes, for example, four-hundred questions designed to identify controls in place at the supplier and the effectiveness of those controls for the supplier. The survey results represent an objective score for the supplier based upon a control environment of the supplier. The survey provides for numerical scores for each of the questions and categories that are used to determine a controls assessment rating 133 (e.g., "Effective") shown in the controls assessment rating result region 180. In embodiments, the controls assessment survey may be conducted at an initial stage (at an initial evaluation of a prospective supplier) and/or regularly (e.g., annually, bi-annually).

With an exemplary embodiment, the communications/connectivity 134 reflects a supplier's controls over its communication network, e.g., to safeguard data, provide access to network devices, provide remote communications, logging and monitoring of such remote access, securing remote access devices, authentication and encryption used to secure communications.

Risk management 136 is a rating of the effectiveness of a supplier's risk management program. For example, does the supplier have contingency plans in place to address various identified risks? Business continuity-disaster recovery (BC-DR) 138 is a rating of a supplier's disaster recovery and business continuity program. For example, a supplier must have formal documented recovery plans to identify the resources and specify actions required to help minimize losses in the event of a disruption to the business unit, support group unit, application, and/or infrastructure component.

Encryption 140 is an assessment and quantification of supplier's encryption policies and procedures, including specifications regarding encryption methods and strength for protection of data both in transit and at rest, as well as key management and storage procedures. Access 142 is an assessment and quantification of supplier's authentication and authorization controls over data, application and platform, as well as, policies and procedures around user access provisioning process and monitoring of such access.

Data integrity 144 is a measure of controls put in place by a supplier to ensure that any data stored, received, controlled, and/or otherwise accessed is accurate and reliable, as well as inspection procedures in place to validate data integrity. Application assessment 146 is a measure of the application controls put in place by a supplier around application change management as well as controls around monitoring, protecting all web-based and mobile application used to store, receive, send or access an organization's data. Business practices 148 represents a rating of supplier's policies and procedures for management oversight of supplier business operations, assurance of processes for responding to customer complaints, handling of non-public information, signing authority, code of conduct, change control, etc. The controls assessment 132 portion of the SRI 102 also includes a quantification of supplier's policies and procedures around management oversight 150 of business operations as well as appropriate responses to any suspected instances of fraud.

In addition to risk attributes 112 and controls assessments 132, some exemplary embodiments for determining a supplier's SRI 102 also include accounting for other risk attributes 152. These other risk attributes 152 may include, for example, financial viability assessments 154 (FVA), an analysis of negative news reports 156, an analysis of concentration of risk 158, a performance rating 160 attributed to the supplier by a delivery manager that results from prior supplier engagements with the rated supplier, a vulnerability impact assessment 162, and reporting on cyber incidents 164. Cyber incidents 164 may include, for example, cyberattacks directed against the supplier that may impact the operations and/or data of the organization. Severity of attacks, breaches, data loss, action plan performance, delays in remediating vulnerabilities, and delays in remediating application controls as measured by agreed upon timeliness or organizational standards are considered and may have varying degrees of impact to the other risk attributes 152. For example, concentration of risk 158 may exist (or be deemed high) when a limited number of suppliers or subcontractors are used to provide similar services.

In an exemplary embodiment, the risk attributes 112, controls assessments 132, and other risk attributes 152 of the supplier are combined to derive (e.g., calculate) an SRI 102 for the supplier. In some exemplary embodiments, this is shown as a percentage, which is derived by building on the Control Effectiveness Score, Application Assessment Score and Performance on Key Performance Indicators (KPI). Further, the system is operable to factor the impact of positive/negative movements of risk elements such as open vulnerabilities/fixes, speed/delay in remediating findings etc., which may be displayed in a user interface 110. An example of such a user interface 110 is shown in FIG. 2.

Figure 2:
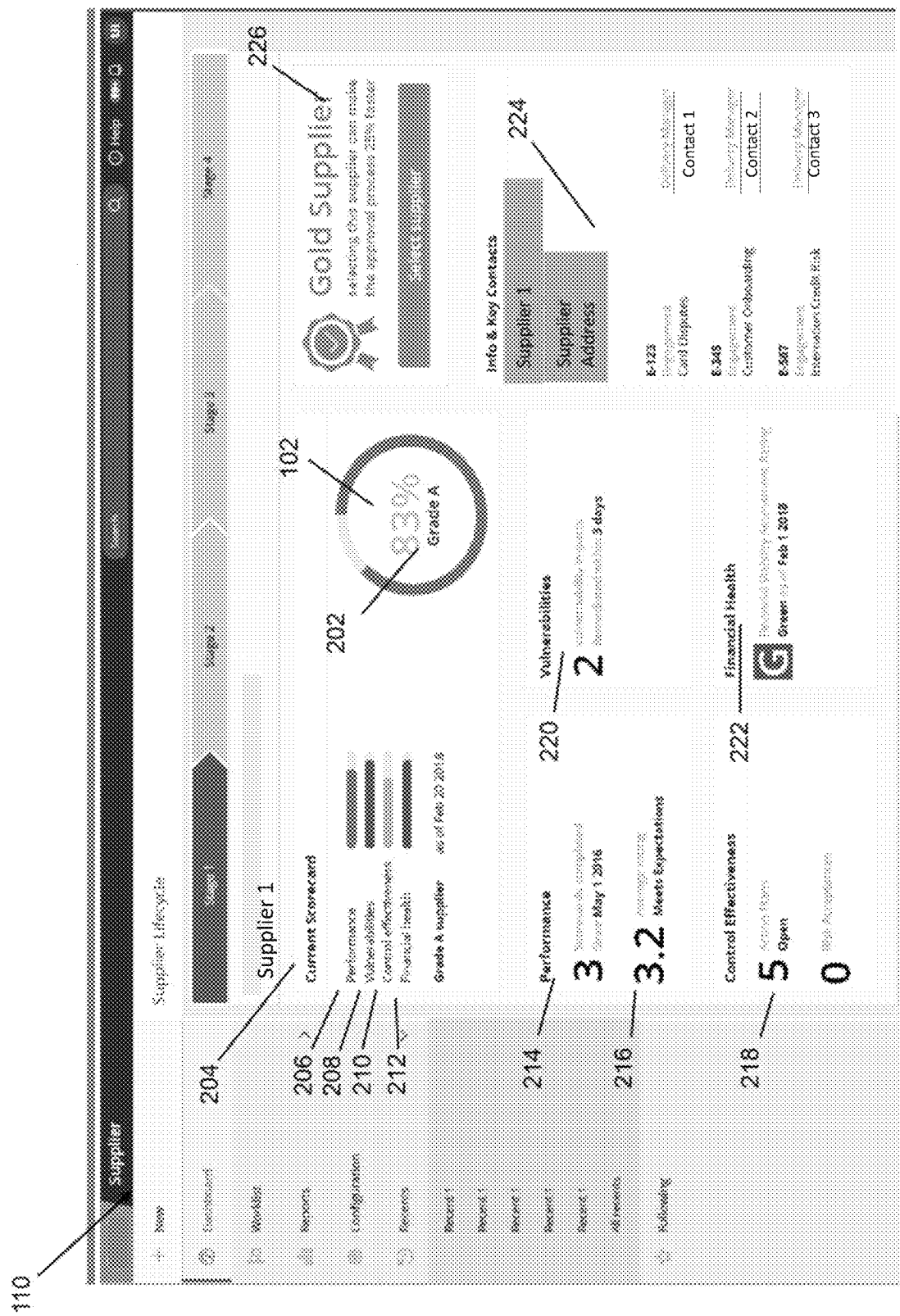
FIG. 2 is an exemplary system SRI summary view (or SRI dashboard) displaying a supplier risk index and other supplier information for a particular supplier, for a user evaluate the risk of the supplier in accordance with aspects of the disclosure.

FIG. 2 is an exemplary interface SRI summary 110 (or SRI dashboard) displaying a supplier risk index (SRI) 102 and other supplier information for a particular supplier (e.g., "Supplier 1"), for a user to evaluate the risk of the supplier in accordance with aspects of the disclosure. In embodiments, the SRI dashboard resides in an organization's supplier onboarding workflow tool.

Figure 4:
FIG. 4 is an overview of an exemplary SRI grading scale, scoring, and GUI color scheme in accordance with aspects of the disclosure.

The exemplary SRI summary (or dashboard) 110 of FIG. 2 illustrates the SRI 102 as a percentage score (e.g., "83%"). Also, as shown in FIG. 2, the exemplary SRI summary 110 indicates a grade score (or grade) 202 (e.g., "A") associated with the SRI 102. In an exemplary embodiment, the grade 202 is determined by comparing the SRI 102 to a series of ranges that represent each grade. For example, as shown in FIG. 4, in an exemplary embodiment, a grade of "A" may be associated with an SRI 102 that ranges from 90 to 100 percent. A grade of "B" may be associated with an SRI 102 of 80 to 89 percent, a grade of "C" may be associated with an SRI 102 of 70 to 79 percent, a grade of "D" may be with an SRI 102 of 61 to 69 percent, and a grade of "F" may be associated with a SRI 102 of 0 to 60 percent.

As shown in FIG. 2, in addition to the SRI 102 and grade 202, an exemplary embodiment of the SRI summary 110 may also include a scorecard 204 (or current scorecard). The scorecard 204 presents a series of key indicators, including, for example, a performance rating 206, a vulnerability rating 208, a control effectiveness rating 210, and a financial health rating 212, which are illustrated in the exemplary embodiment as bar graphs (e.g., color-coded bar graphs).

Additionally, the SRI summary 110 includes a performance section 214, which may include data regarding scorecard completion 216 (e.g., a number of scorecards competed and an average performance rating). The SRI scorecard 204 may also include control effectiveness section 218 (e.g., indicating a number of open action plans and a number of risk acceptances) and a vulnerability section 220 (e.g., indicating a number of vulnerability impacts and a period for remediation of vulnerabilities).

As shown in FIG. 2, in embodiments, the SRI summary 110 may also include financial health rating data 222, including a Financial Viability Assessment (FVA). FVA is an analysis of a supplier's perceived financial condition and comes in the form of an assessment of financials performed by an organization's designated analyst team, which results in financial health rating of supplier.

In addition to risk data, the SRI summary 110 may comprise information and contacts for the supplier as illustrated in the information and key contacts section 224. In certain embodiments, the supplier may be provided with a performance rating in the form of supplier preference tiers (e.g. "Gold Supplier," "Silver Supplier," "Bronze Supplier.") As illustrated, the exemplary embodiment of FIG. 2, the SRI summary 110 indicates a "preference rating" 226 (e.g., "Gold Supplier"), which indicates possible performance benefits that may be realized by selecting the supplier.

Figure 3:
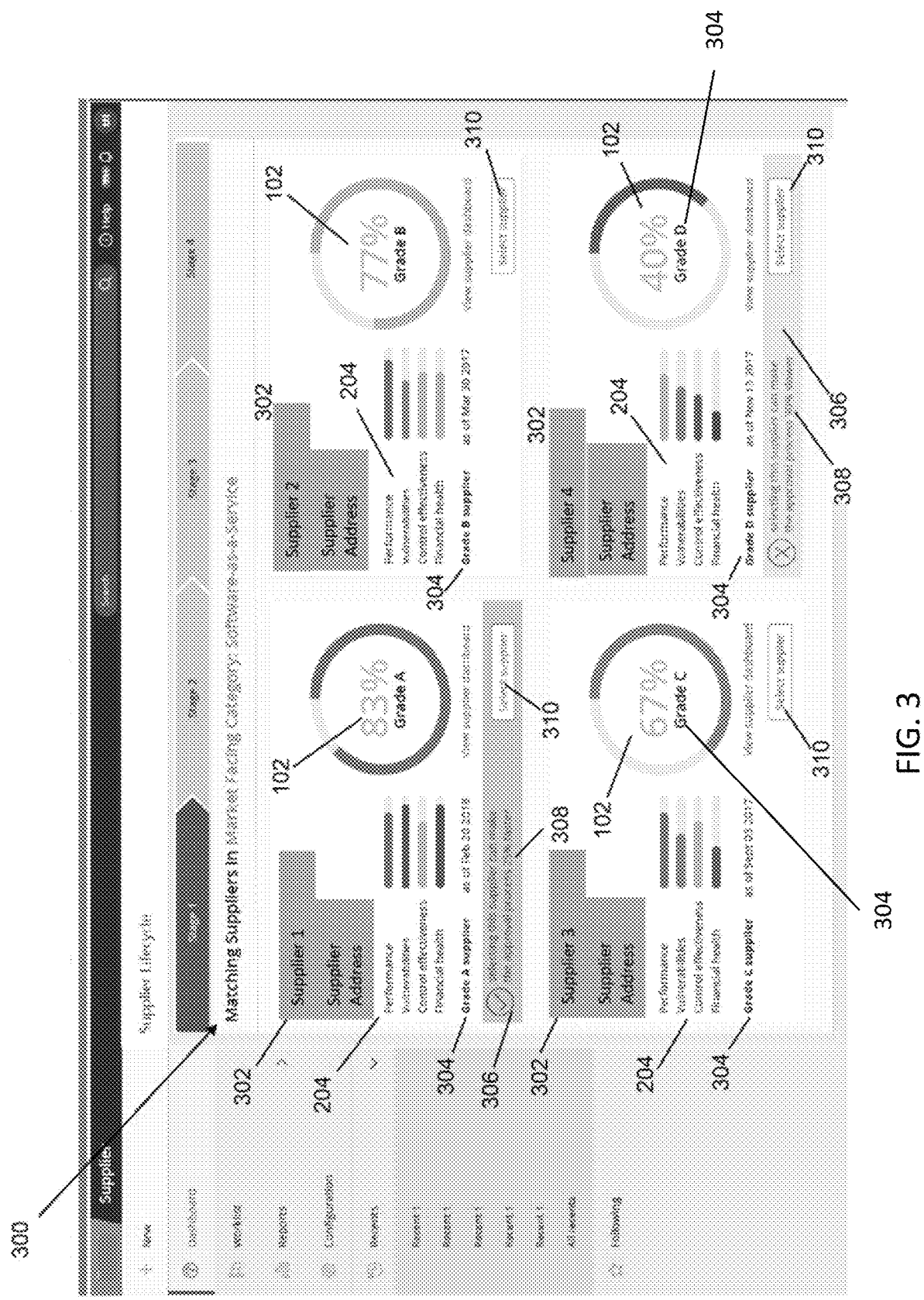
FIG. 3 is an exemplary supplier selection interface displaying a plurality of suppliers, the supplier risk index, and other supplier information associated with each supplier, for a user to compare the suppliers for a specific service category (and select a supplier) in accordance with aspects of the disclosure.

FIG. 3 is an exemplary supplier selection interface 300 displaying a plurality of suppliers (e.g., "Supplier 1," "Supplier 2," "Supplier 3," and "Supplier 4"), the supplier risk index 102, and other supplier information associated with each supplier, for a user (e.g., a delivery manager) to compare the suppliers for a specific service category (and, if desired, select a supplier and create a supplier agreement) in accordance with aspects of the disclosure. As illustrated in FIG. 3, the exemplary user interface 300 for comparison of suppliers comprises a plurality of SRI 102 scores. In addition to the SRI 102 score for each supplier, the user interface 300 comprises scorecard 204 for each supplier displayed. Additionally, supplier information and address 302 may be displayed in the supplier selection interface 300. As illustrated, a grade 304 may be assigned to each supplier and displayed on the supplier selection interface 300. In addition to SRI 102 scores, scorecards 204, and a grade 304, the user interface 300 may indicate recommendations (or warnings) 306 in cases (e.g., for "Supplier 1" and "Supplier 4"). These recommendations 306 can be positive or negative in nature (e.g., warnings) and provide information 308 regarding the ramifications of selecting a particular supplier. For example, real-time risk data for suppliers who are part of preferred supplier program (e.g. "Gold Supplier" program) indicates a proven track record of meeting performance risk (based on collected historical data), and commercial and contractual requirements. In accordance with aspects of the disclosure, this information 308 increases the confidence in supplier selection, significantly reduces supplier onboarding times, and reduces the risk exposure to the organization.

In accordance with aspects of the disclosure, the exemplary embodiments provide a technological contribution by enhancing the ability of an organization to immediately select suppliers (assuming the SRI score is deemed acceptable). As such, in embodiments, the user interface 300 may include a "select supplier" button 310 to commence a supplier selection transaction. In embodiments, selecting the button 310 causes the system to display a second user interface (not shown) that allows the user to select the supplier to provide a particular good or service.

FIG. 4 is an overview of an exemplary SRI grading scale, scoring, and GUI color scheme in accordance with aspects of the disclosure. FIG. 4 depicts an exemplary SRI grading scale 400, control effectiveness and application control assessment scoring categories 405, performance scorecard scoring categories 410, cyber risk categories 415, and GUI color scheme (e.g., green (G), blue (B), yellow (Y), orange (O), and red (R)) in accordance with aspects of the disclosure. As shown in FIG. 4, in contemplated embodiments, the grade may include more specificity that "A," "B," "C," etc. (e.g., "A+" and "D−"). As indicated in FIG. 4, in accordance with the GUI color scheme: a grade of "A" (e.g., "A+" and "A−") may be indicated in green (G); a grade of "B" (e.g., "B+" and "B−") may be indicated in blue (B); a grade of "C" (e.g., "C+" and "C−") may be indicated in yellow (Y); a grade of "D" (e.g., "D+" and "D−") may be indicated in orange (O); and a grade of "F" may be indicated in red (R).

As shown in FIG. 4, exemplary control effectiveness and application control assessment scoring categories 405 may include: "Effective," which (in accordance with the GUI color scheme) may be indicated with a green (G) color; "Mostly Effective," which may be indicated with a blue (B) color; "Partially Effective," which may be indicated with an orange (O) color; and "Mostly Deficient," which may be indicated with a red (R) color.

The performance scorecard scoring categories 410 may include: "Exceeds Expectations," which (in accordance with the GUI color scheme) may be indicated with a green (G) color; "Meets Expectations," which may be indicated with a blue (B) color; "Low Meets Expectations," which may be indicated with a yellow (Y) color; "Needs Improvement," which may be indicated with an orange (O) color; and "Unsatisfactory," which may be indicated with a red (R) color. Additionally, as shown in FIG. 4, the cyber risk scoring categories 415 may include: "No Known Issues," which (in accordance with the GUI color scheme) may be indicated with a green (G) color; "Moderate," which may be indicated with an orange (O) color; and "Major," which may be indicated with a red (R) color.

Figure 5:
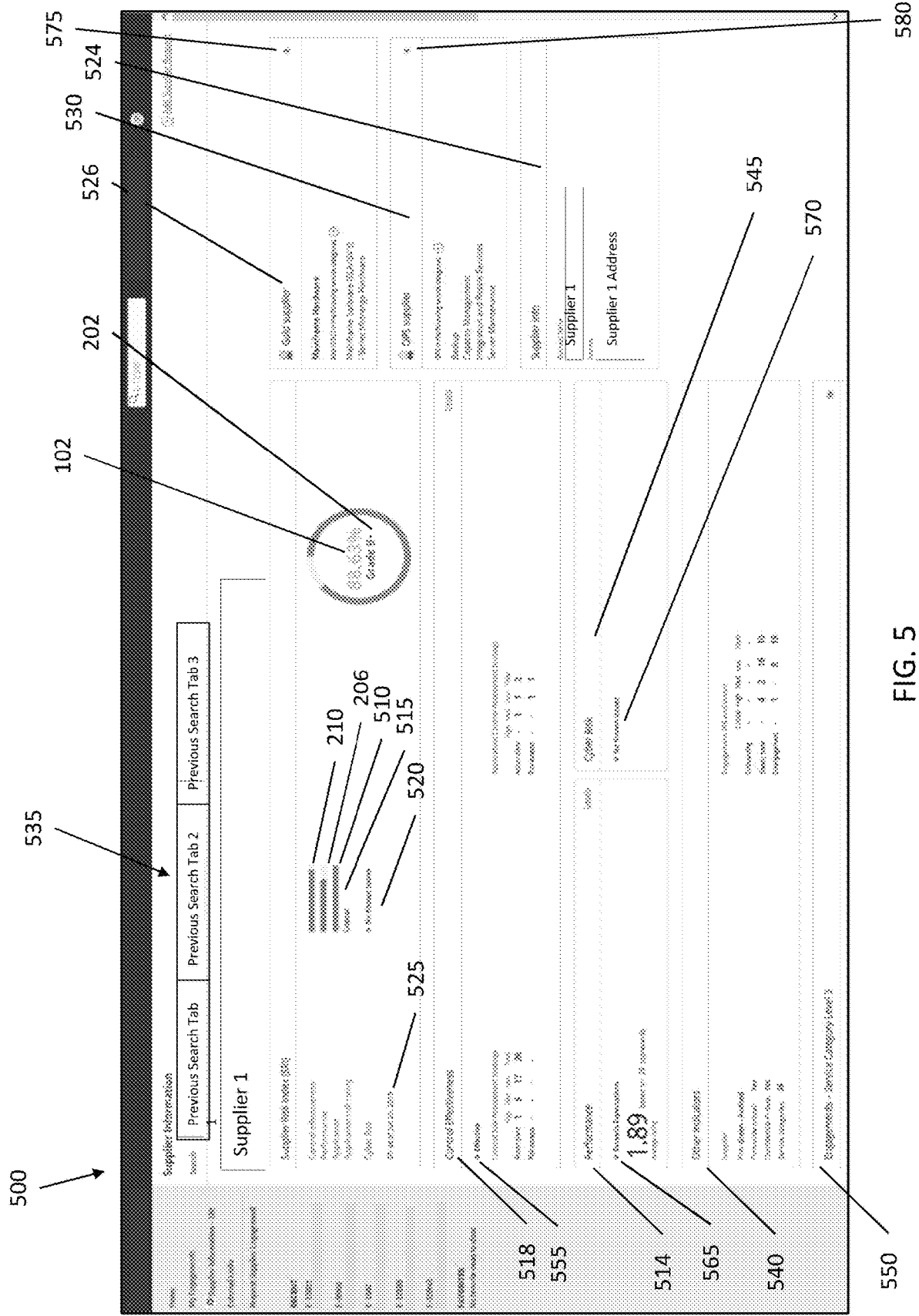
FIG. 5 is an exemplary dashboard view displaying a supplier risk index and other supplier information for a particular supplier, for a user to evaluate the risk of the supplier in accordance with aspects of the disclosure.

FIG. 5 is an exemplary interface main information dashboard 500 displaying a supplier risk index 102 and other supplier information for a particular supplier (e.g., "Supplier 1"). In accordance with aspects of the disclosure, the main information dashboard 500 provides a single view of a supplier's risk information with relevant and pertinent real-time information for a user to evaluate the risk of a particular supplier, e.g., in real-time. As shown in FIG. 5, the main information dashboard 500 provides a snapshot of Supplier SRI Score 102/202, metrics including, for example, a performance rating 206, a control effectiveness rating 210, an application assessment 510, application risk rating 515, and a cyber risk indication 520. The snapshot 110 also includes a time indication 525 (e.g., a date, or a date and time) of how recently the SRI has been updated.

As shown in FIG. 5, the main information dashboard 500 also includes a status of a supplier in a supplier Relationship Management program 526 (e.g., "Gold Supplier"), QPS (or Qualified and Performing Supplier) supplier data 530, and supplier name, address, and contact information 524. The interface main page 500 may further include other indicators 540 (e.g., Financial Viability Assessment), an Engagement Portfolio Mix 550, amongst other risk indicators, risk contributors, and other information, in accordance with aspects of the disclosure.

As shown in FIG. 5, the dashboard 500 also includes a performance section 514 with a performance indicator 565 (e.g., "Exceeds Expectations"), which may include data regarding scorecard completion (e.g., a number of scorecards competed and an average performance rating, e.g., "1.89") based on historical data. The dashboard 500 also displays a control effectiveness section 518 with a control effectiveness rating 555 (e.g., "effective"), and also indicating a number of open action plans and a number of risk acceptances, which may be organized, e.g., by size for both control risk assessment findings and application control assessment findings. The dashboard 500 also includes a cyber risk section 545, which lists any known/identified cyber risks.

Figure 6:
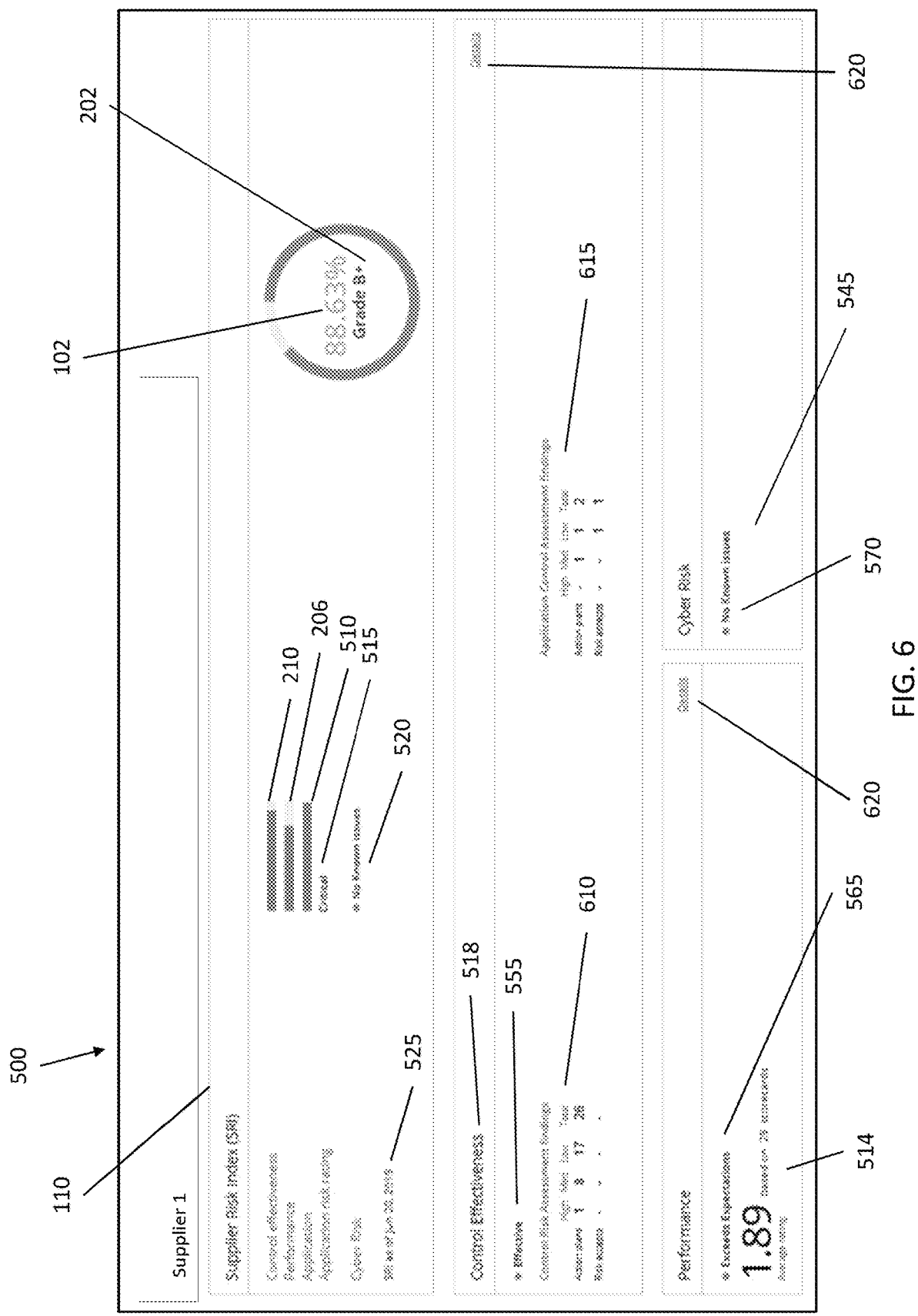
FIG. 6 is an exemplary closer dashboard view displaying a supplier risk index and other supplier information including Key Supplier Risk Metrics and Score for a particular supplier, for a user evaluate the risk of the supplier in accordance with aspects of the disclosure.

FIG. 6 is a closer view of the exemplary main dashboard 500 displaying a supplier risk index 102 and other supplier information for a particular supplier (e.g., "Supplier 1"). In accordance with aspects of the disclosure, the dashboard 500 provides a single view with relevant and pertinent real-time information for a user to evaluate the risk of a particular supplier, e.g., in real-time. As shown in FIG. 6, the dashboard 500 provides a snapshot view 110 of Supplier SRI Score—a comprehensive supplier risk score 102 on a one-hundred point scale and graded 202 with corresponding color code). As also shown in FIG. 6, the dashboard 500 includes metrics including a graphical display of supplier's performance on Key Supplier Risk elements (e.g., a performance rating 206, a control effectiveness rating 210, an application assessment 510, application risk rating 515, and a cyber risk indication 520—a dedicated indicator for Cyber Risk). The snapshot 110 also includes a time indication 525 of how recently the SRI has been updated (i.e., an SRI Run Date), which in embodiments, updates at least daily.

As shown in FIG. 6, the snapshot view 110 also includes a performance section 514, which may include data regarding scorecard completion (e.g., a number of scorecards competed and an average historical performance rating (e.g., based on aggregated completed performance scorecards). Also, the snapshot view 110 includes a control effectiveness section 518 (e.g., a number of open action plans and a number of risk acceptances, e.g., organized by size for both control risk assessment findings and application control assessment findings). The control effectiveness section 518 information is based on and determined from an independent due diligence by an outside evaluator, and includes: (1) Consolidated CE Rating 555; (2) Outstanding Risk Issues; and (3) Overdue items (if any). As shown in the exemplary embodiment of FIG. 6, for this supplier, the CE Rating 555 is "Effective" and is presented in green (in accordance with the color scheme). The interface main page 500 also includes a cyber risk section 545, a dedicated Cyber Risk detail tile to list any identified cyber issues, which lists any known/identified cyber risks.

In accordance with further aspects of the disclosure, detailed views (of the performance dated and the control effectiveness data) are available by selecting (e.g., clicking on) a details button 620 at the right hand corner of the tiles (e.g., control effectiveness section 518 or performance section 514). The detailed views provide immediate access to underlying data and provides deeper insights into contributing elements, allowing a user to easily dig-down through the underlying data in order to enhance, improve and facilitate a supplier selection process. In embodiments, the detailed views provide immediate access (via details button 620) to detailed underlying information to identify deeper insights into contributing elements, including assessments, impacted engagements, findings (both control risk assessment and application control assessment), and overdue items.

Figure 7:
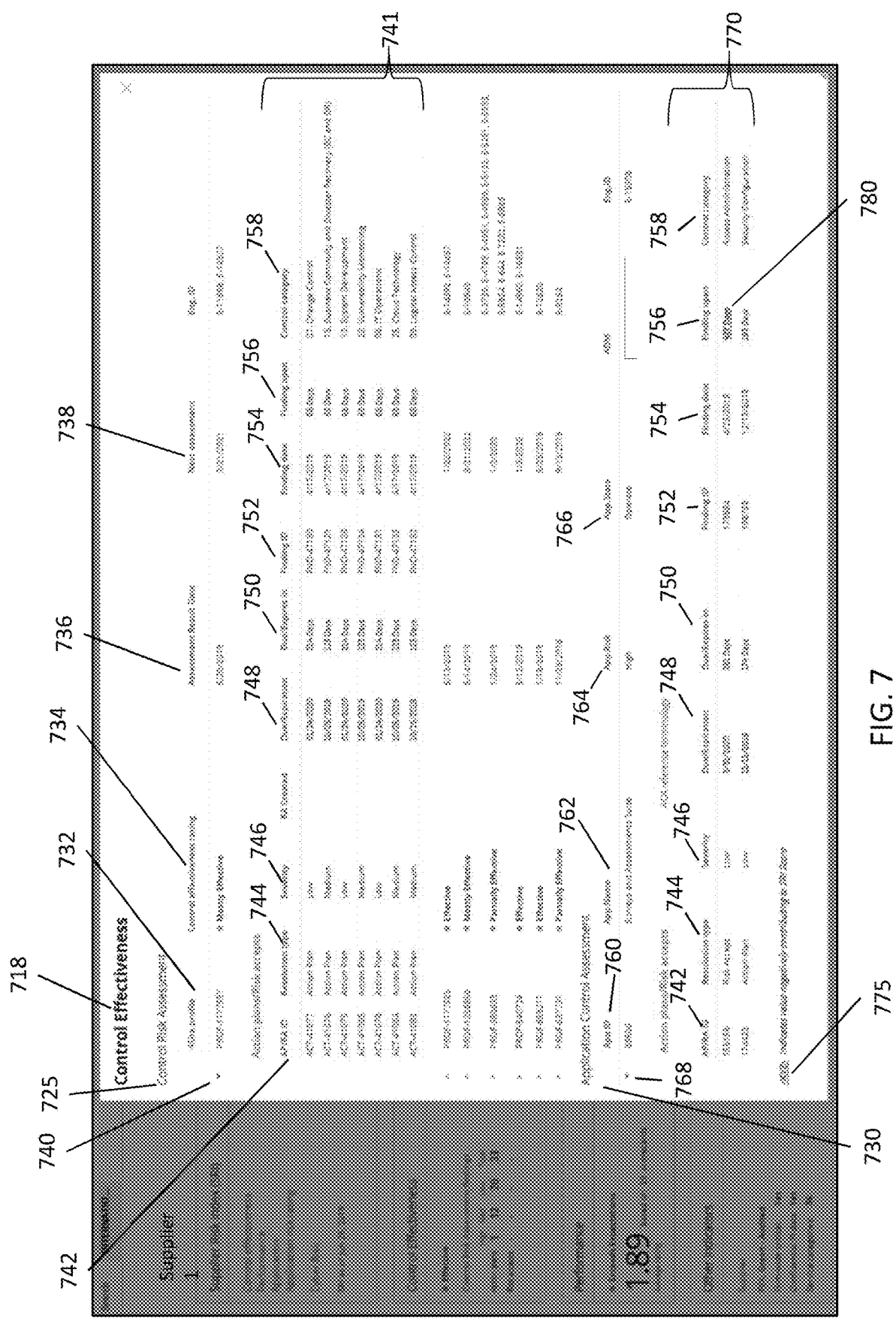
FIG. 7 is an exemplary control effectiveness (CE) detailed view showing a detailed view of control risk assessment of a supplier and application control assessment of a supplier in accordance with aspects of the disclosure.

FIG. 7 is an exemplary control effectiveness detailed view 718, which includes details of a supplier's control risk assessment 725 and application control assessment 730 in accordance with aspects of the disclosure. As shown in FIG. 7, the control effectiveness detailed view 718 provides detailed information and permits deeper insights into contributing elements, including assessments, impacted engagements, findings (both control risk assessment and application control assessment), and overdue items in accordance with aspects of the disclosure.

For the supplier's control risk assessment 725, the detailed view 718 may include listed profiles 732, a control effectiveness rating 734 (e.g., "Mostly Effective"), an assessment result date 736, a next assessment date 738, amongst other information. Additionally, by clicking on a corresponding drop down arrow 740, more detailed action plan/risk accepts information 741 for a particular profile can be viewed. In embodiments, the more detailed action plan/risk accepts information 741 may include ID information 742, resolution type 744, severity 746, due date/expiration date 748, days remaining before due date/expiration date 750, finding ID 752, finding date 754, the number of days the finding is open 756, and a control category 758 (e.g., BC & DR, IT operations, cloud technology).

For the application control assessment 730, the detailed view 718 may include application ID 760, application Name 762, application risk 764 (e.g., "High"), application state 766, amongst other information. Additionally, by clicking on a corresponding drop down arrow 768, more detailed action plan/risk accepts information 770 for a particular profile can be viewed. In embodiments, the more detailed action plan/risk accepts information 770 may include ID information 742, resolution type 744, severity 746 (e.g., "Low"), due date/expiration date 748, days remaining before due date/expiration date 750, finding ID 752, finding date 754, the number of days the finding is (or has been) open 756, and a control category 758. As also shown in FIG. 7, some of the data 780 may be highlighted to indicate (with a corresponding key 775) that the highlighted data 780 is having a negative impact on the resulting SRI score. By implementing aspects of the disclosure, a user can utilize the detailed views to gain deeper insights into contributing elements, allowing the user to easily dig-down through date in order to more efficiently make a supplier decision. In such a manner, embodiments of the present disclosure are a technological contribution over existing approaches.

Figure 8:
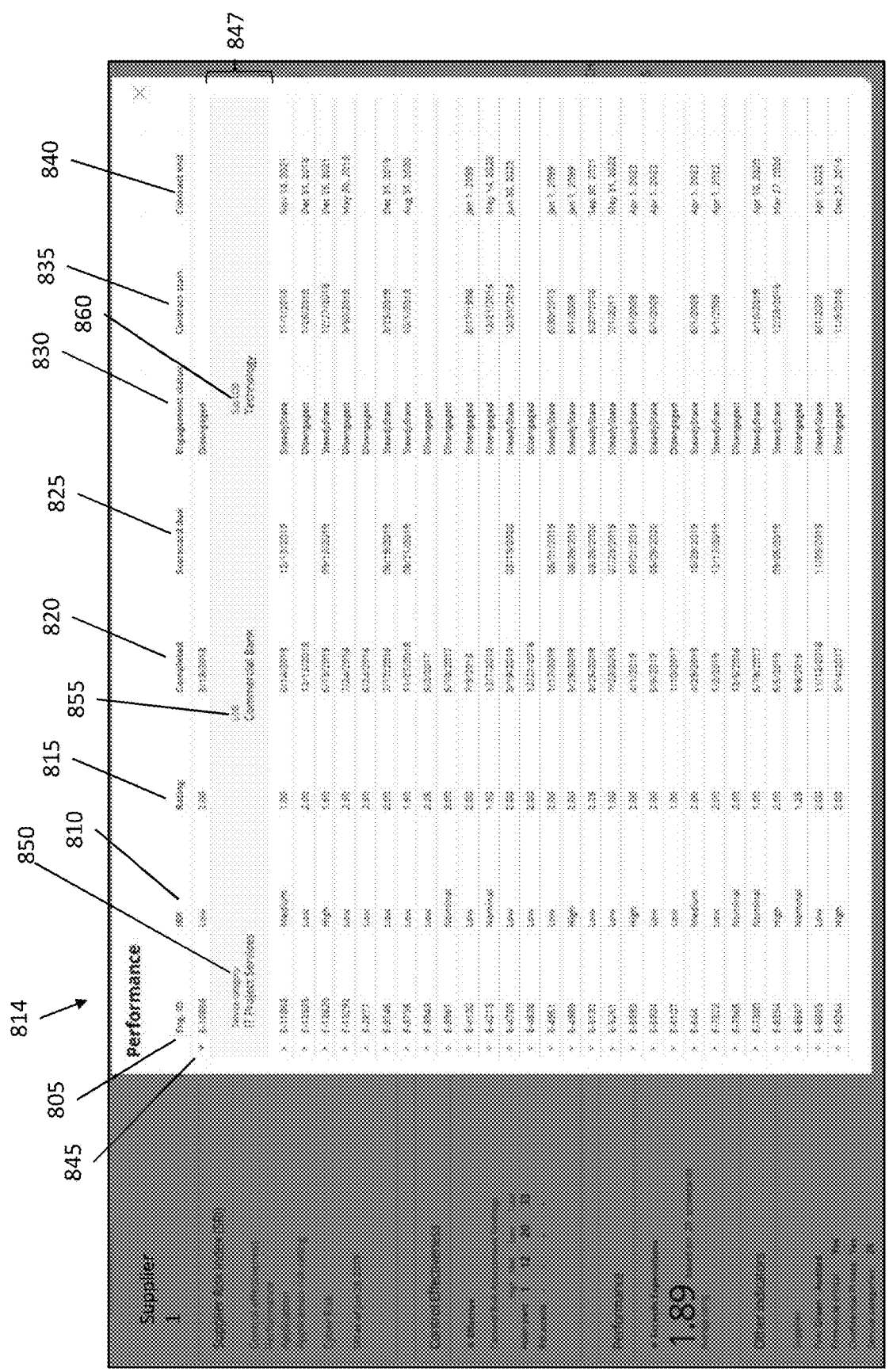
FIG. 8 is an exemplary performance detailed view in accordance with aspects of the disclosure.

FIG. 8 is an exemplary performance detailed view 814, which provides historical performance data for completed scorecards and insights into scores, IRR, risk ratings, engagement status and contract start/end dates for engagements with completed scorecards in accordance with aspects of the disclosure. As shown in FIG. 8, the detailed view 814 may include listed IDs 805, an IRR category 810 (e.g., "high," "medium," or "low"), a numerical rating 815, a completion date 820, a scorecard due date 825, an engagement status 830, a contract start date 835, and a contract end date 840. Additionally, by clicking on a corresponding drop down arrow 845, a user (e.g., delivery manager) can immediately access more detailed information 847 for a particular performance data entry. In embodiments, the more detailed information 847 may include a service category 850, a line of business (LOB) category 855, and a sub line of business (LOB) 860. By implementing aspects of the disclosure, a user can immediately utilize the detailed views of the historical performance data to gain deeper insights into contributing elements, allowing the user to assess a supplier's risk by easily digging-down through date in order to more efficiently make a supplier decision.

Figure 9A:
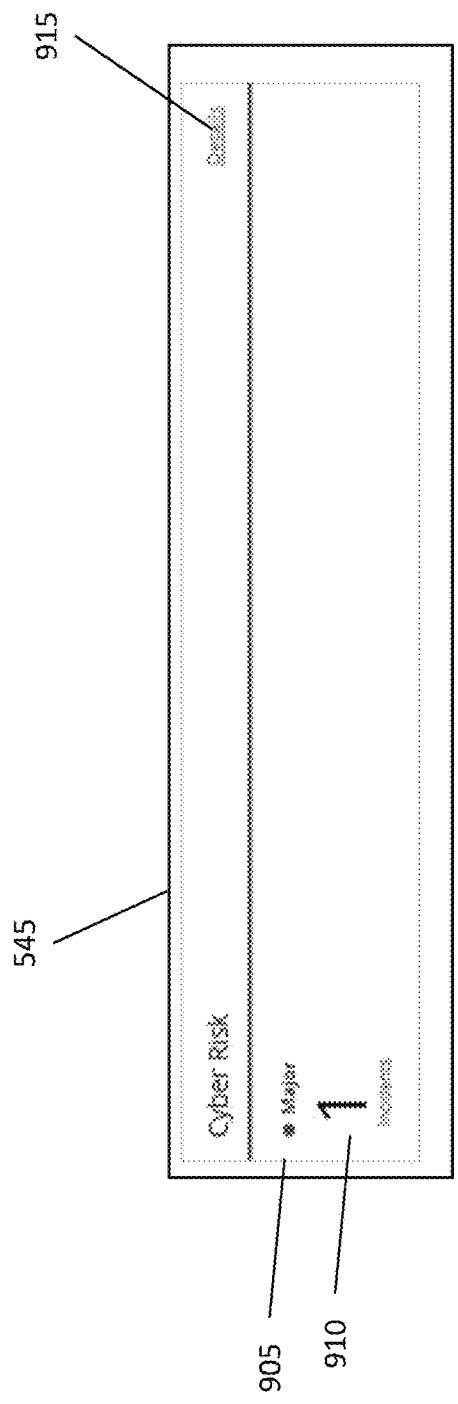
FIG. 9A is an exemplary cyber risk overview section (or tile) in accordance with aspects of the disclosure.

FIG. 9A is an exemplary cyber risk overview section (or tile) 545 in accordance with aspects of the disclosure. The cyber risk tile 545 summarizes the severity 905 of any cyber risks (e.g., "major") a supplier may have suffered and/or encountered, and number 910 of cyber incidents (e.g., "1") a supplier may have undergone. As shown in FIG. 9A, the cyber risk overview section (or tile) 545 includes a details button 915, which when actuated, opens a cyber risk detailed view 945 (e.g., window).

Figure 9B:
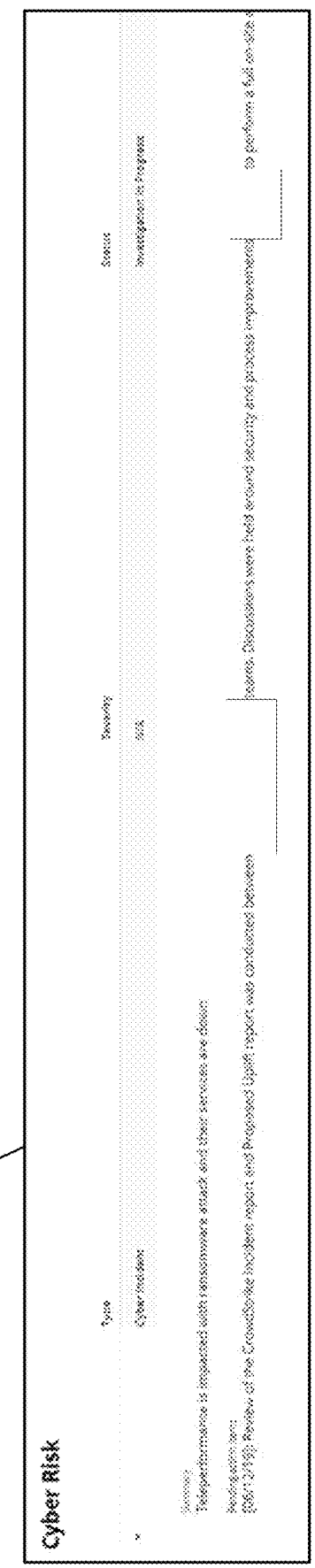
FIG. 9B is an exemplary cyber risk detailed view in accordance with aspects of the disclosure.

FIG. 9B is an exemplary cyber risk detailed view 945 in accordance with aspects of the disclosure. In the cyber risk detailed view 945, the details of each of a supplier's cyber risk is available for users to view, along with existing pending supplier actions items from the supplier. In accordance with aspects of the disclosure, the impact of the cyber risk to the supplier's SRI score will depend on the severity of a particular cyber risk event. For example, if data or services being provided to a customer (from a particular supplier) are impacted by the cyber event, the severity is deemed high, and the particular supplier's SRI score will drop (in real-time or near real-rime) to a Grade F. In addition, the supplier's SRI score will reflect the outstanding cyber risk (e.g., in real-time) until the supplier completes remediation activities and the cyber risk event is closed.

Figure 10:
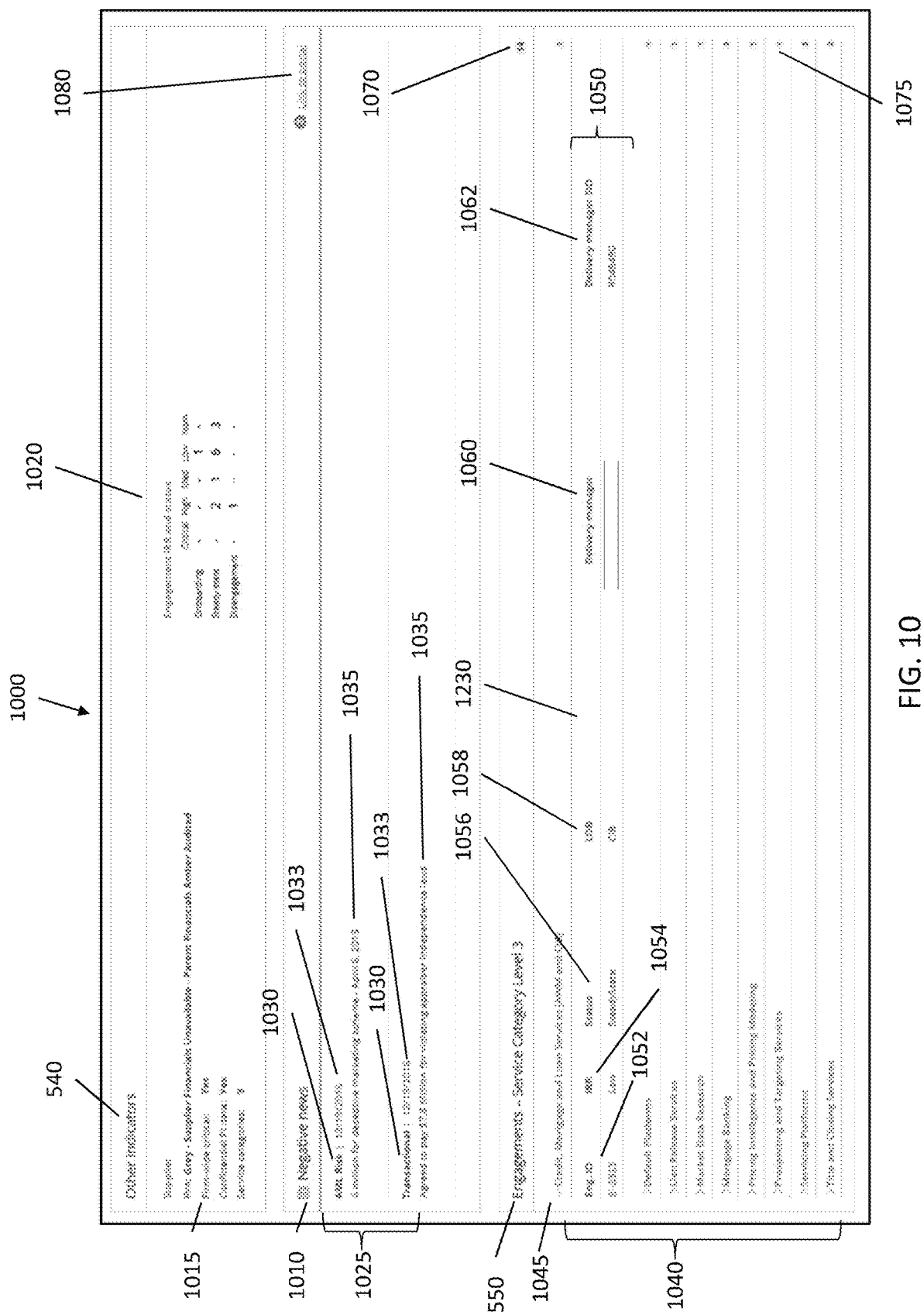
FIG. 10 is an exemplary interface view showing additional risk assessment information that may impact SRI in accordance with aspects of the disclosure.

FIG. 10 is an exemplary interface view 1000 showing additional risk assessment information that may impact the SRI in accordance with aspects of the disclosure. As shown in FIG. 10, the additional risk information may include, for example, an other indicators section 540, (including engagement portfolio mix), a negative news 1010 section (if any negative news), and engagements section 550 listing various engagements 1040 by service category. The other indicators section 540 may include supplier audits 1015, engagement IRR status data 1020. The other indicators section 540 may include a link 1080 to a portal.

The negative news section 1010 may list any negative news 1025 for the supplier, which may have an impact on the supplier's SRI. Each instance of negative news may include a title 1033, a date 1035, and a headline 1035 describing the negative news, (which may be a hyperlink to the corresponding negative news article).

The engagements section 550 lists various engagements 1040 by service category, and by clicking on a menu arrow 1045, a user can immediately view additional information 1050 about a selected engagement. In embodiments, the additional information 1050 may include an engagement ID 1052, an IRR 1054, a status 1056, a LOB indication 1058, a delivery manager name 1060, and a delivery manager identification 1065. Additionally, as shown in FIG. 10, the engagements section 550 may indicate a total number of engagements 1070 (e.g., 14), and may also indicate a number 1075 of each of the various engagements 1040 by service category.

Figure 11:
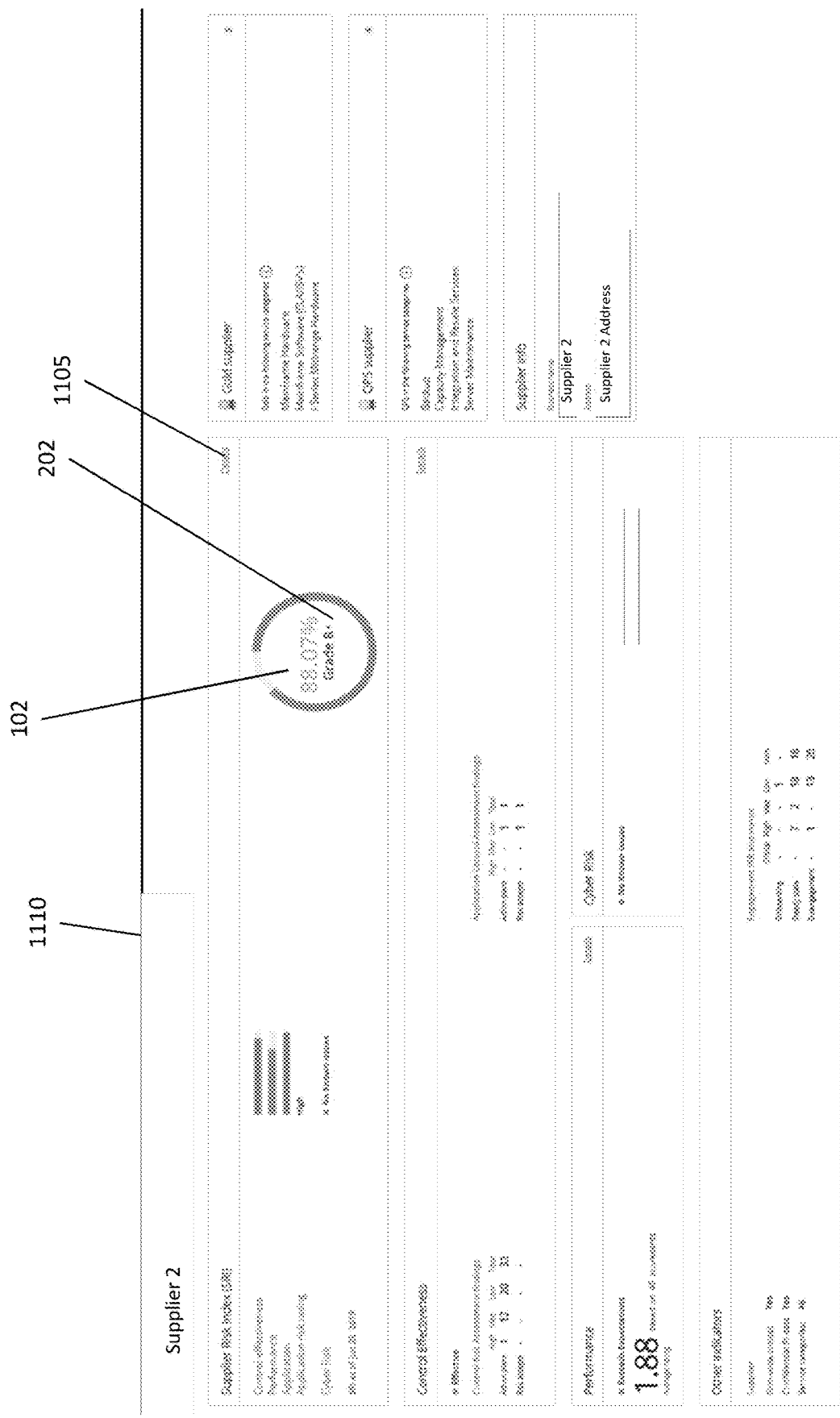
FIG. 11 is an exemplary dashboard view for a risk assessment of a parent supplier (with at least one child supplier) in accordance with aspects of the disclosure.

FIG. 11 is an exemplary supplier dashboard 1100 for a risk assessment of a parent supplier (with at least one child supplier) in accordance with aspects of the disclosure. That is, in addition to providing an SRI for individual suppliers, if the supplier is a parent supplier (themselves having one or more child suppliers), the system is operable to determine an SRI for a parent supplier that accounts for the SRIs of the child suppliers. In embodiments of the disclosure, the SRI for parent supplier is calculated again (e.g., independently) and is not a simple average of underlying child suppliers.

Besides the above-described views of individual suppliers (e.g., including an SRI score 102 and SRI grade 202 and other information and links discussed above), the parent supplier dashboard 1100 also has a Parent—Child Supplier mapping available in an SRI parent-child detailed view, which may be accessed by actuating a details button 1105.

Figure 12:
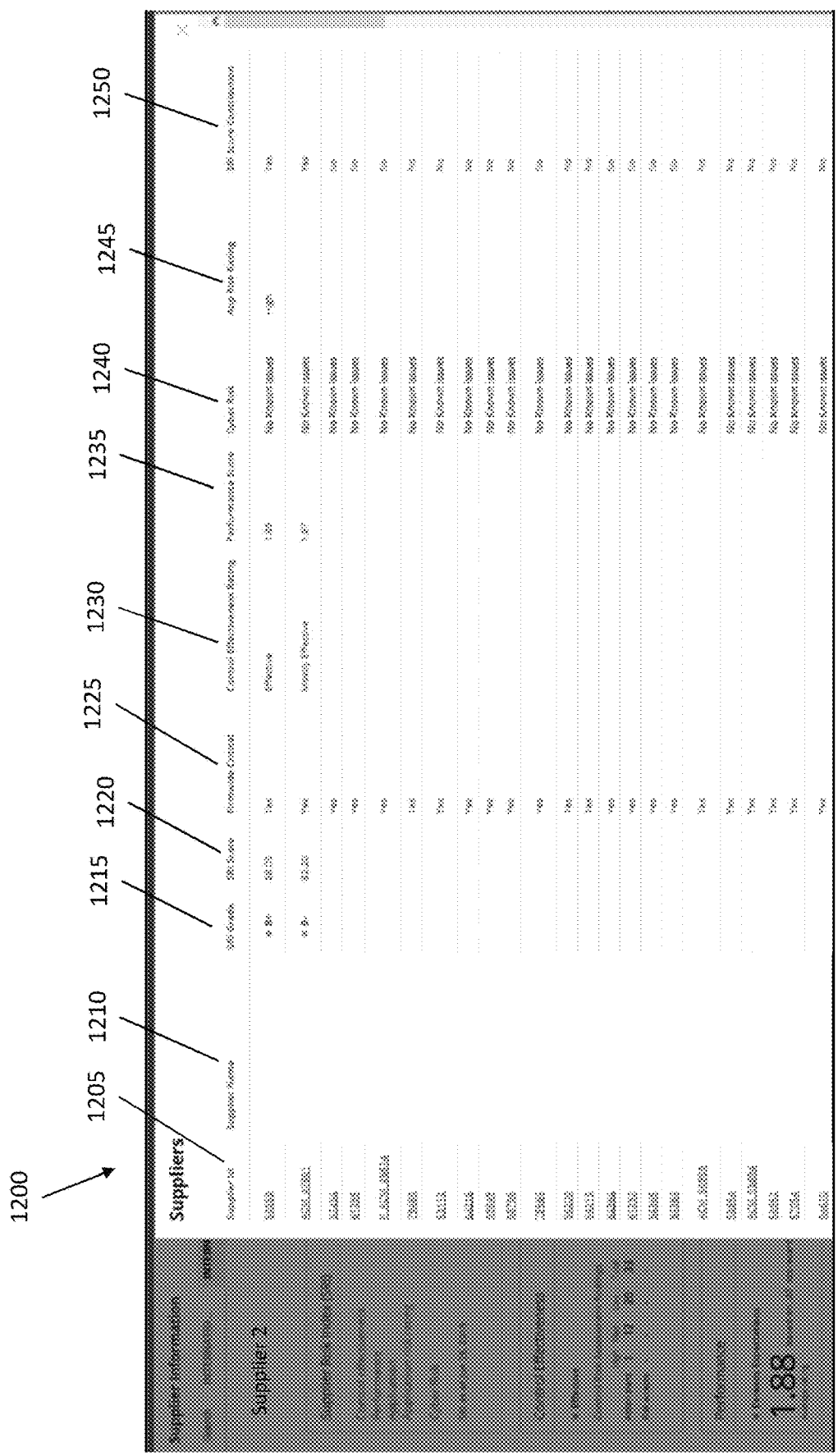
FIG. 12 is an exemplary detailed mapping view for a parent supplier in accordance with aspects of the disclosure.

FIG. 12 is an exemplary detailed mapping view 1200 (accessed by actuating a details button 1105 of FIG. 11) of child suppliers for a parent supplier in accordance with aspects of the disclosure. By accessing the detailed mapping view 1200, individual (child) supplier details with corresponding risk indicator values and links to access specific child supplier SRI dashboards is made available to a user (e.g., a supply manager).

As shown in FIG. 12, with an exemplary embodiment, the detailed mapping view 1200 includes child supplier details including a supplier ID 1205, a supplier name 1210, an SRI grade (e.g., letter grade) 1215, an SRI score (e.g., numerical) 1220, an indication of whether the child supplier firm-wide critical 1225, a control effectiveness rating 1230, a performance score 1235, a cyber risk rating 1240, an application risk rating 1245 (e.g., "High"), and an indication 1250 of whether the child supplier contributes to the SRI score of the parent supplier. By implementing aspects of the disclosure, a user can immediately utilize the detailed views of the real-time child supplier data to gain deeper insights into contributing elements, allowing the user to easily dig-down through date in order to more efficiently make a parent supplier decision.

Figure 13:
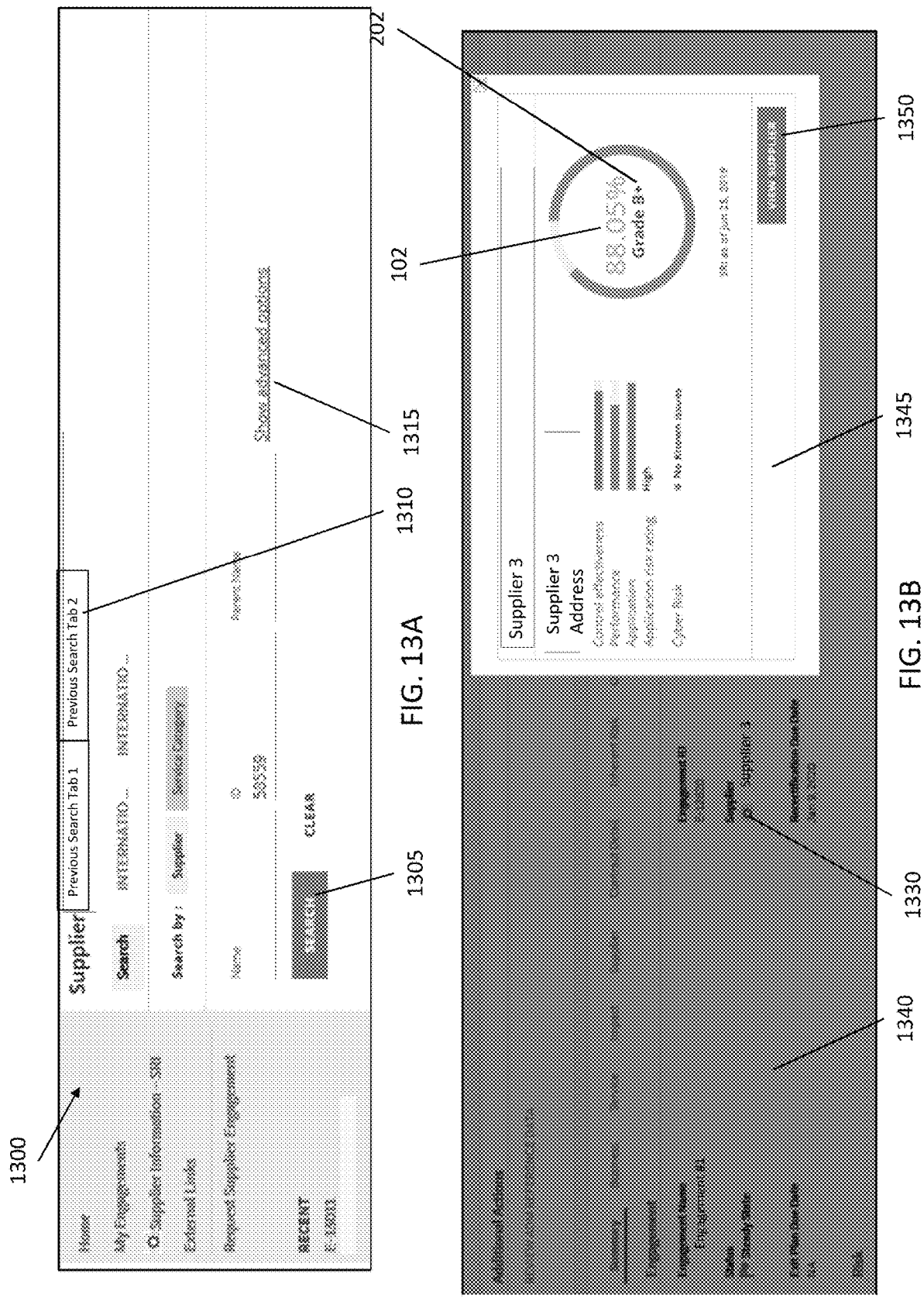
FIG. 13A depicts an exemplary search interface and how a user may access SRI information via, for example, a drop-down menu in accordance with aspects of the disclosure.
FIG. 13B depicts an exemplary dashboard and shows how a user may access SRI information via hovering an input device (e.g. mouse) over an SRI icon in accordance with aspects of the disclosure.

FIG. 13A depicts an exemplary search interface 1300 and how supplier SRI information may be accessed (e.g., within COMPASS) via, for example, a drop-down menu and/or a search button 1305 in accordance with aspects of the disclosure. As shown in FIG. 13A, the search interface 1300 includes previous search tabs 1310 (for quickly accessing previous search results), and a link to advanced searching options 1315 (e.g., filters, Boolean search, etc.).

FIG. 13B depicts an exemplary dashboard 1340 and shows how an SRI Summary view 1345 may be accessed via hovering an input device (e.g. mouse) over an SRI icon 1330 from the dashboard interface 1340 in accordance with aspects of the disclosure. When the SRI icon 1330 is actuated, the SRI Summary view 1345 is provided as a pop-up window overlaying the dashboard 1340. By implementing these aspects of the disclosure, a user can quickly utilize the detailed views of the child supplier data (which may be updated regularly and in embodiments, in real-time) to gain deeper insights into contributing elements, allowing the user to easily dig-down through date in order to more efficiently make a parent supplier decision. In such a manner, embodiments of the disclosure are a technical contribution over the existing approaches for supplier risk assessment.

Figure 14:
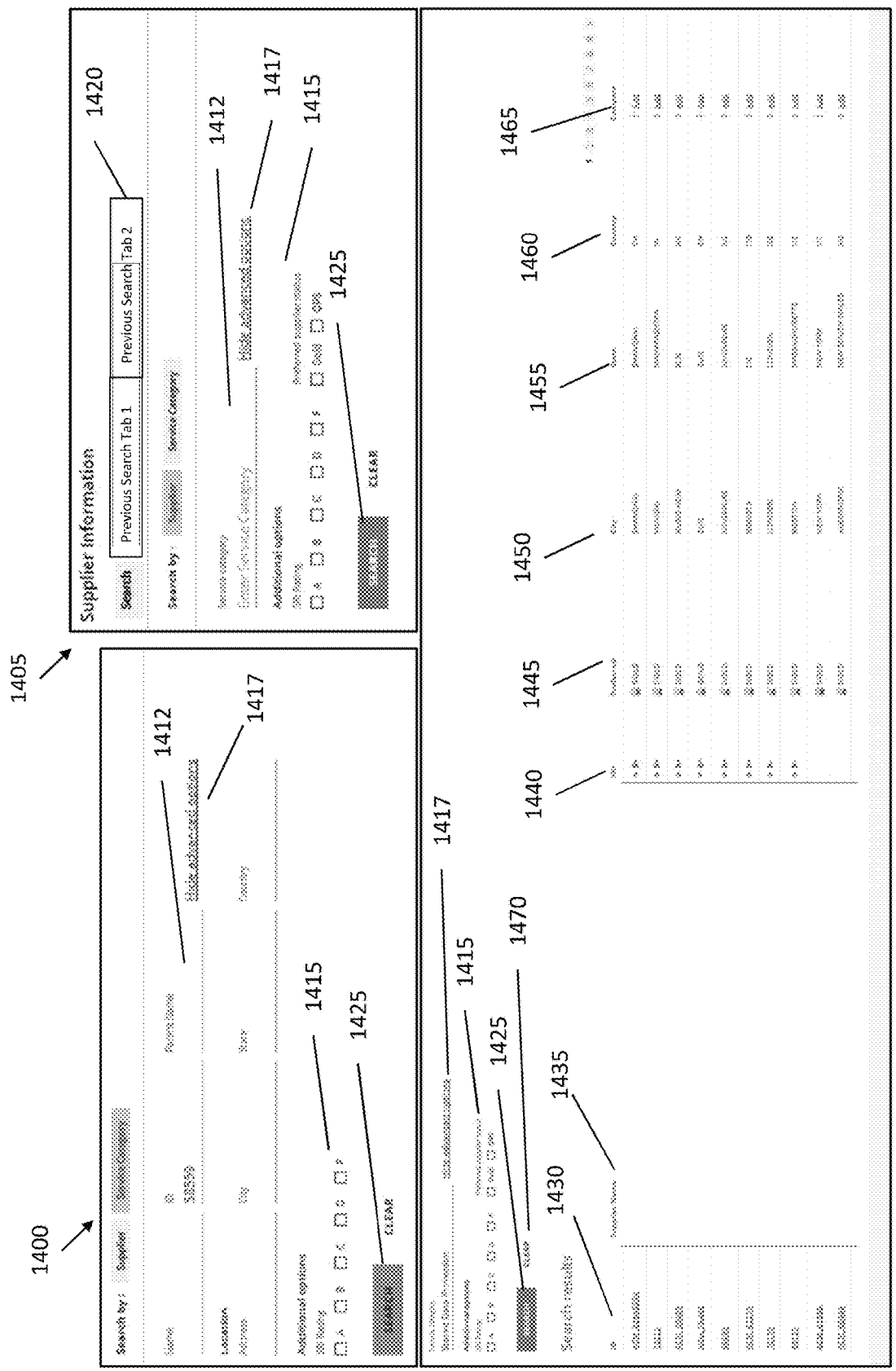
FIG. 14 depicts exemplary search request interfaces and a search results interface in accordance with aspects of the disclosure.

FIG. 14 depicts exemplary search request interfaces 1400 and 1405, and a search results interface 1410 in accordance with aspects of the disclosure. The search request interfaces 1400 and 1405 may be utilized for search and comparison of suppliers based on Supplier ID and/or Service Category with advanced filters. The a search results interface 1410 provides the results of the selected search, in which users can also compare between the search results, in accordance with aspects of the disclosure.

As shown in FIG. 14, the SRI determination and supplier selection system provides an option to search based on Supplier ID (e.g., as shown in search/compare interface 1400) or Service Category (e.g., as shown in search/compare interface 1405) with advanced filter options 1415 (e.g., accessible via an additional advanced searching options button 1417). Once selection criteria are entered (e.g., in one or more search fields 1412), a user can request a search of supplier information by actuating the search button 1425. Upon actuating the search button 1425, the user is presented with the search results (e.g., as depicted in the exemplary search results interface 1410). Additionally, users can also immediately review previous search results using, for example, previous search tabs 1420.

As shown in FIG. 14, the exemplary search results interface 1410 displays the search results of a search a user requested using. e.g., one of the search and compare interfaces 1400 and 1405. In contemplated embodiments, the exemplary search results interface 1410 includes supplier information including, for example, supplier ID 1430, supplier name 1435, SRI grade 1440 (e.g., "B+"), preferred supplier status 1445 (e.g., "Gold"), city 1450, state 1455, and country 1460. Additionally, in accordance with additional aspects of the disclosure, users can also compare between selections of the search results using, the respective comparison add buttons 1465 (and actuating a compare button (not shown)). The search results interface 1410 also includes advanced filters 1415 (e.g., "by SRI grade" or "by preferred status"), which may be accessible via button 1417), one or more search fields 1412, a search button 1425 for entering further search queries, and a clear button 1470 for clearing any filters.

Figure 15:
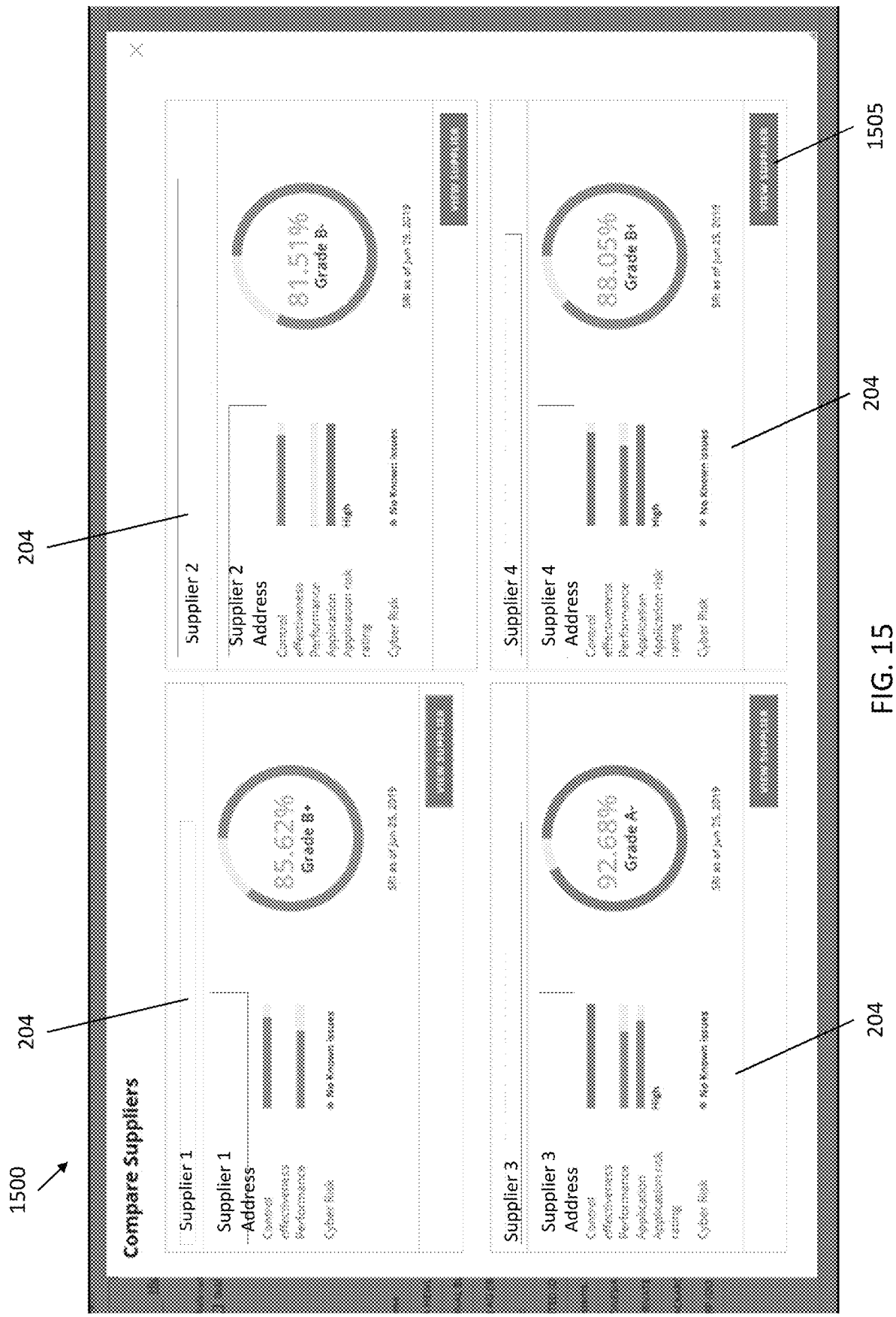
FIG. 15 is an exemplary supplier comparison view displaying a plurality of suppliers, the supplier risk index, and other supplier information associated with each supplier, for a user to compare the suppliers for a specific service category in accordance with aspects of the disclosure.

FIG. 15 is an exemplary supplier comparison view 1500 displaying information (e.g., SRI scorecards 204 for plurality of suppliers (e.g., "Supplier 1," "Supplier 2," "Supplier 3," and "Supplier 4"), the respective supplier risk indices (SRIs), and other supplier information associated with each supplier in accordance with aspects of the disclosure. In embodiments, the SRI system provides an option to compare suppliers between search results. In accordance with aspects of the disclosure, this comparison aids an organization in making better informed decisions in their supplier selection and minimizing the risk exposure to the organization. After a user has selected (e.g., up to four potential suppliers, with the exemplary and non-limiting depicted embodiment) for comparison using the comparison add buttons 1465 (see, FIG. 14), the system is operable to display the supplier comparison view 1500 with SRI scorecards 204 for those selected suppliers. Additionally, the supplier comparison view 1500 includes a view supplier button 1505 for each displayed supplier, so that a user can directly access that supplier's SRI dashboard for more detailed SRI and risk information. By implementing these aspects of the disclosure, a user can quickly utilize the supplier comparison view 1500 (which may be updated regularly and in embodiments, in real-time) to gain deeper insights and differentiators between the potential suppliers, in order to more efficiently make a supplier decision.

Figure 16:
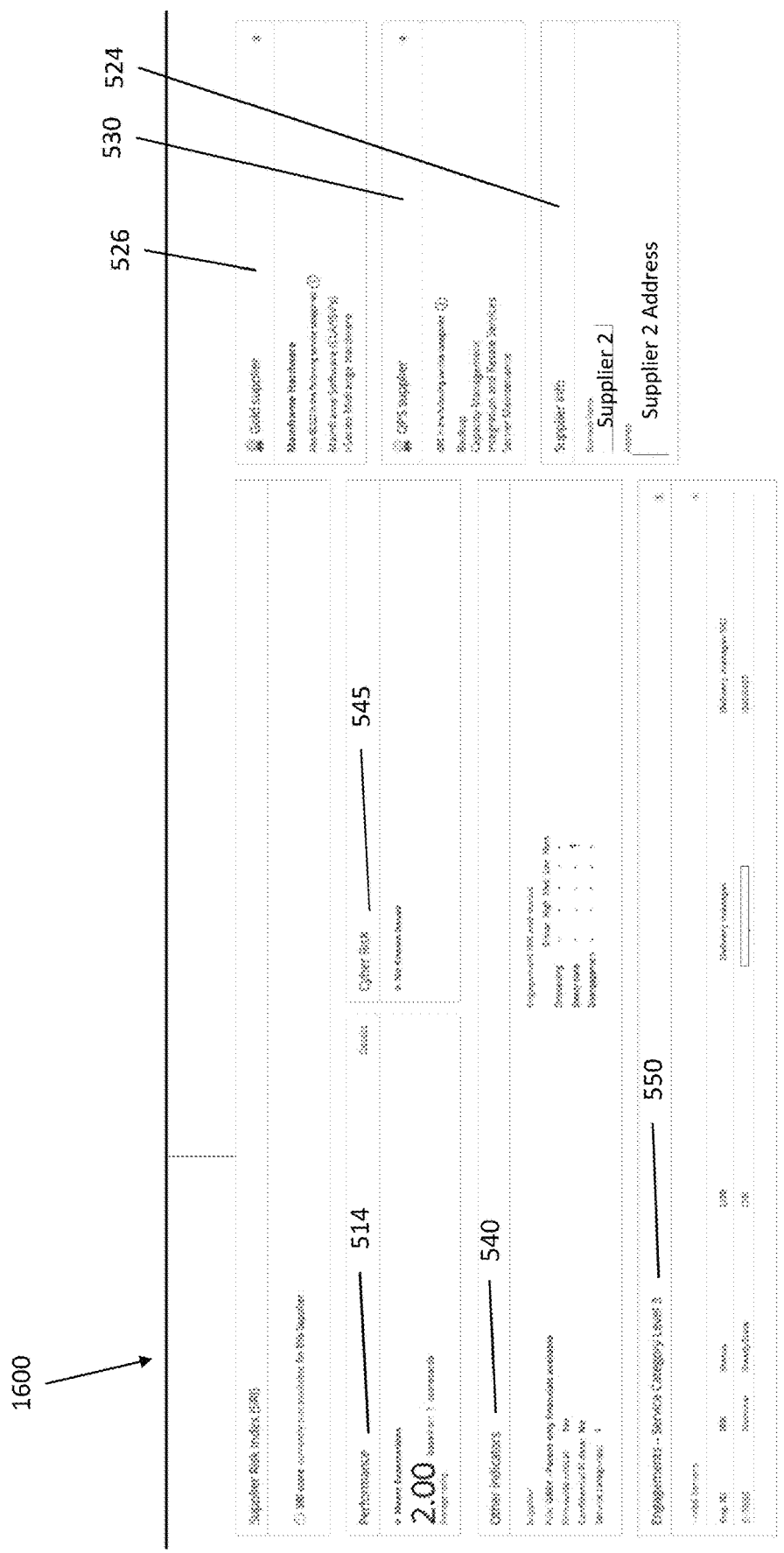
FIG. 16 is an exemplary dashboard view in which no SRI is provided in accordance with aspects of the disclosure.

FIG. 16 is an exemplary dashboard 1600 for a supplier in which no SRI is provided in accordance with aspects of the disclosure. In some contemplated scenarios, the SRI score itself may not be available. In any event, the system is operable to display and presently available supplier information in the SRI Dashboard. Thus, as shown in FIG. 16, the dashboard 1600, while not indicating an SRI score or grade, may provide information in an Engagement Portfolio Mix 550 section, information in a performance section 514, information in the cyber risk section 545, other indicators 540, a status in a supplier Relationship Management program 526 (e.g., "Gold"), QPS supplier data 530, and supplier information 524. Thus, in accordance with aspects of the disclosure, even if an SRI score is not available, the user may utilize the system to gain valuable information and glean insights from the supplier SRI scores and other data, in order to more efficiently make a supplier selection decision.

System Environment

Figure 17:
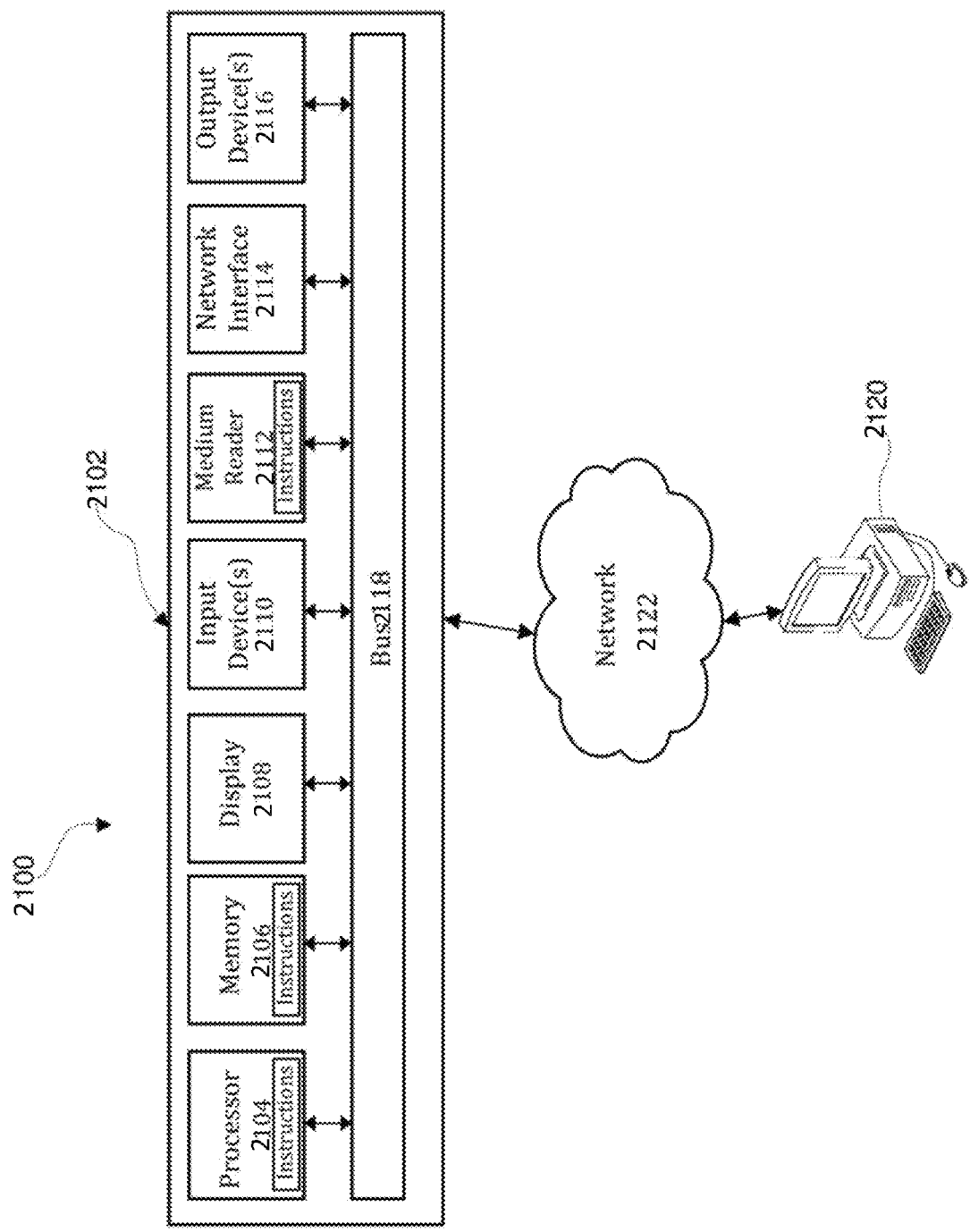
FIG. 17 is an exemplary system environment for use in accordance with the embodiments described herein.

FIG. 17 is an exemplary system for use in accordance with the embodiments described herein. The system 2100 is generally shown and may include a computer system 2102, which is generally indicated.

The computer system 2102 may include a set of instructions that can be executed to cause the computer system 2102 to perform any one or more of the methods or computer based functions disclosed herein, either alone or in combination with the other described devices. The computer system 2102 may operate as a standalone device or may be connected to other systems or peripheral devices. For example, the computer system 2102 may include, or be included within, any one or more computers, servers, systems, communication networks or cloud environment. Even further, the instructions may be operative in such cloud-based computing environment.

In a networked deployment, the computer system 2102 may operate in the capacity of a server or as a client user computer in a client-server user network environment, a client user computer in a cloud computing environment, or as a peer computer system in a peer-to-peer (or distributed) network environment. The computer system 2102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 2102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 17, the computer system 2102 may include at least one processor 2104. The processor 2104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 2104 is an article of manufacture and/or a machine component. The processor 2104 is configured to execute software instructions in order to perform functions as described in the various embodiments herein. The processor 2104 may be a general purpose processor or may be part of an application specific integrated circuit (ASIC). The processor 2104 may also be a microprocessor, a microcomputer, a processor chip, a controller, a microcontroller, a digital signal processor (DSP), a state machine, or a programmable logic device. The processor 2104 may also be a logical circuit, including a programmable gate array (PGA) such as a field programmable gate array (FPGA), or another type of circuit that includes discrete gate and/or transistor logic. The processor 2104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 2102 may also include a computer memory 2106. The computer memory 2106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 2106 may comprise any combination of memories or a single storage.

The computer system 2102 may further include a display 2108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 2102 may also include at least one input device 2110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 2110. Moreover, those skilled in the art further appreciate that the above-listed, exemplary input devices 2110 are not meant to be exhaustive and that the computer system 2102 may include any additional, or alternative, input devices 2110. In accordance with aspects of the disclosure, one or more of these input devices 2110 (e.g., GPS information, data center temperature information) may be used as feed data used to calculate a supplier's SRI.

The computer system 2102 may also include a medium reader 2112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 2106, the medium reader 2112, and/or the processor 2110 during execution by the computer system 2102.

Furthermore, the computer system 2102 may include any additional devices, components, parts, peripherals, hardware, software or any combination thereof which are commonly known and understood as being included with or within a computer system, such as, but not limited to, a network interface 2114 and an output device 2116. The output device 2116 may be, but is not limited to, a speaker, an audio out, a video out, a remote control output, a printer, or any combination thereof.

Each of the components of the computer system 2102 may be interconnected and communicate via a bus 2118 or other communication link. As shown in FIG. 17, the components may each be interconnected and communicate via an internal bus. However, those skilled in the art appreciate that any of the components may also be connected via an expansion bus. Moreover, the bus 2118 may enable communication via any standard or other specification commonly known and understood such as, but not limited to, peripheral component interconnect, peripheral component interconnect express, parallel advanced technology attachment, serial advanced technology attachment, etc.

The computer system 2102 may be in communication with one or more additional computer devices 2120 via a network 2122. The network 2122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 2122 which are known and understood may additionally or alternatively be used and that the exemplary networks 2122 are not limiting or exhaustive. Also, while the network 2122 is shown in FIG. 17 as a wireless network, those skilled in the art appreciate that the network 2122 may also be a wired network.

The additional computer device 2120 is shown in FIG. 17 as a personal computer. However, those skilled in the art appreciate that, in alternative embodiments of the present application, the computer device 2120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 2120 may be any additional device or apparatus commonly known and understood in the art without departing from the scope of the present application. For example, the computer device 2120 may be the same or similar to the computer system 2102. Furthermore, those skilled in the art similarly understand that the device may be any combination of devices and apparatuses.

Of course, those skilled in the art appreciate that the above-listed components of the computer system 2102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 18B:
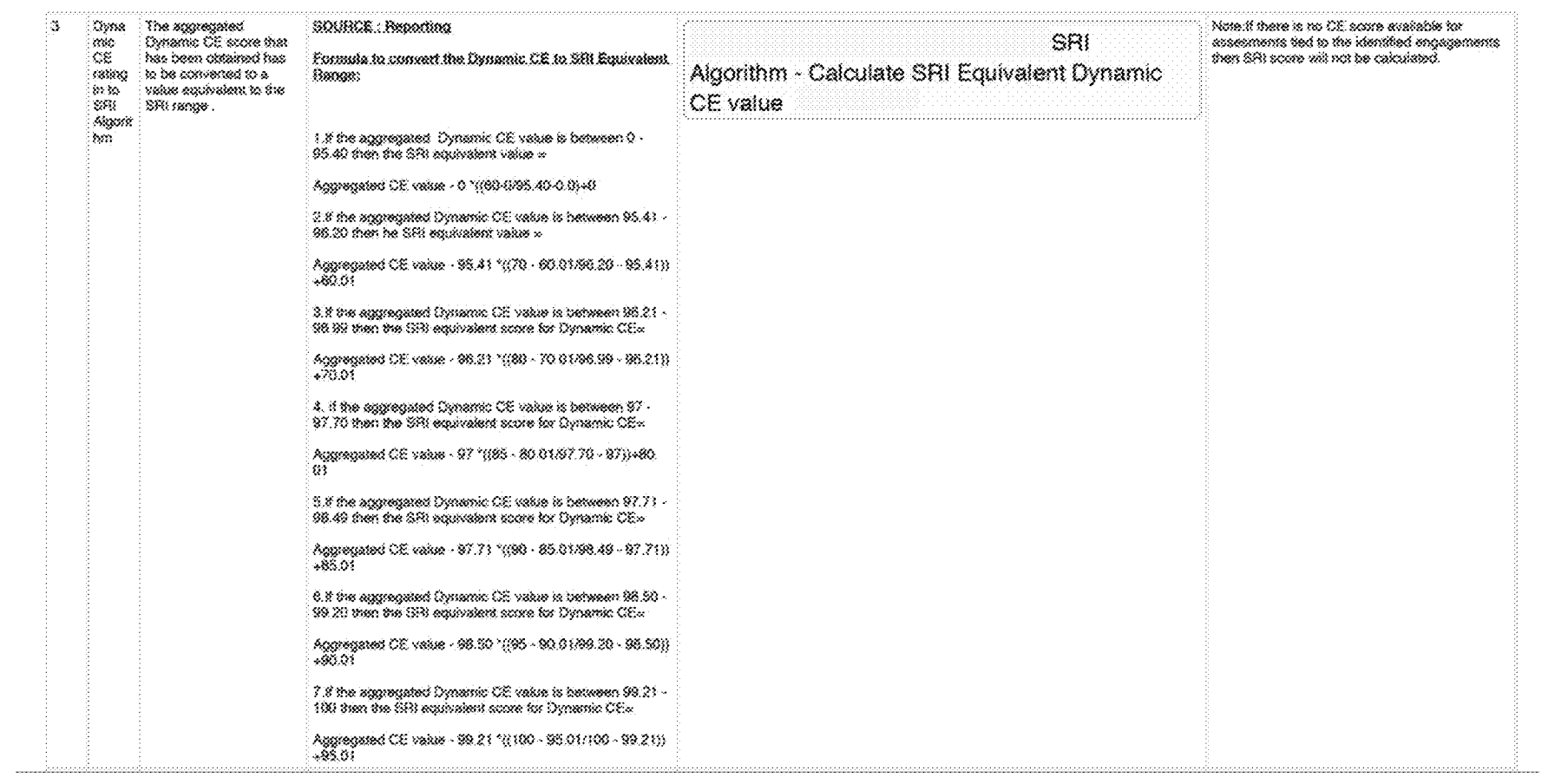
Figure 18C:
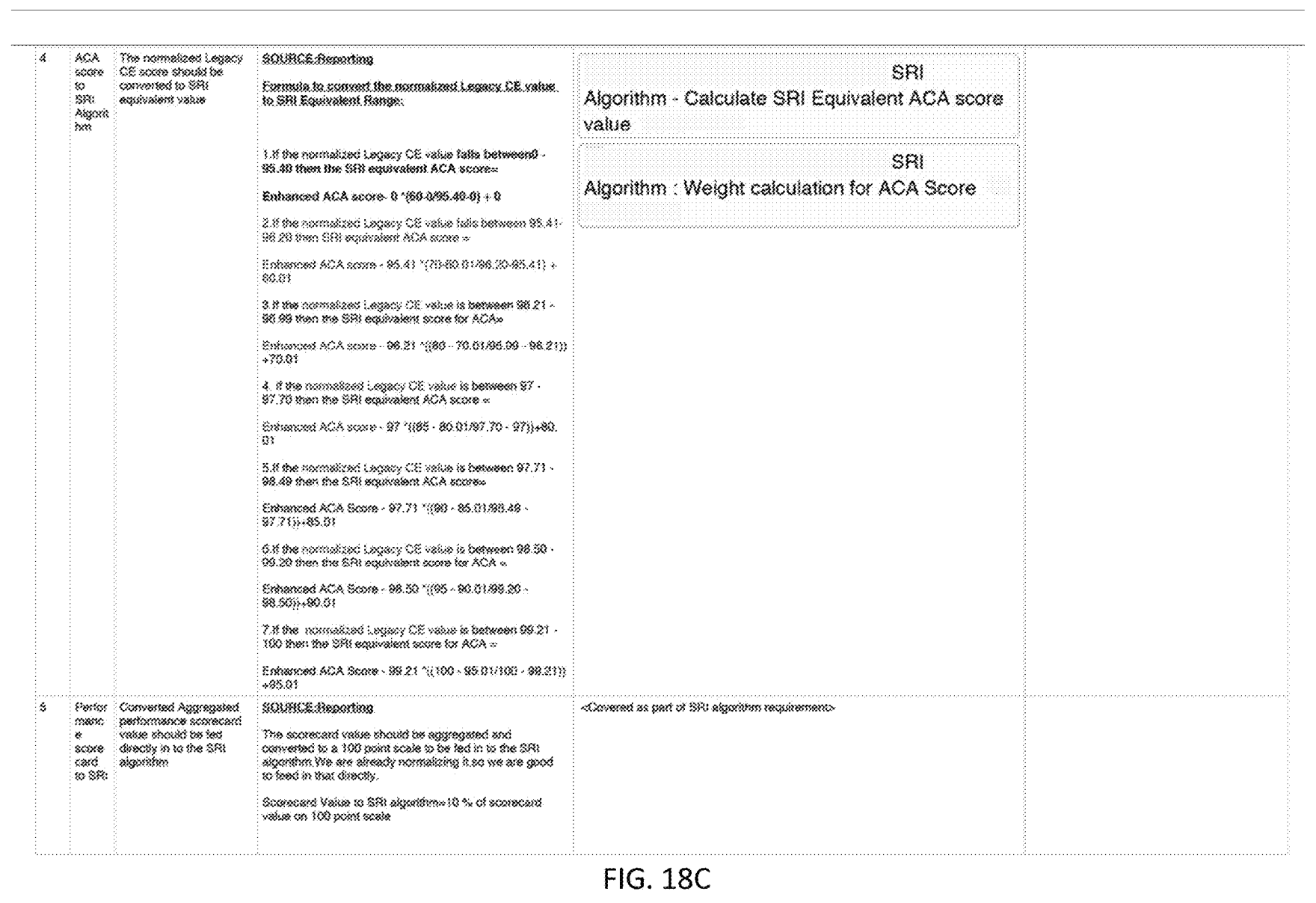
Figure 18D:
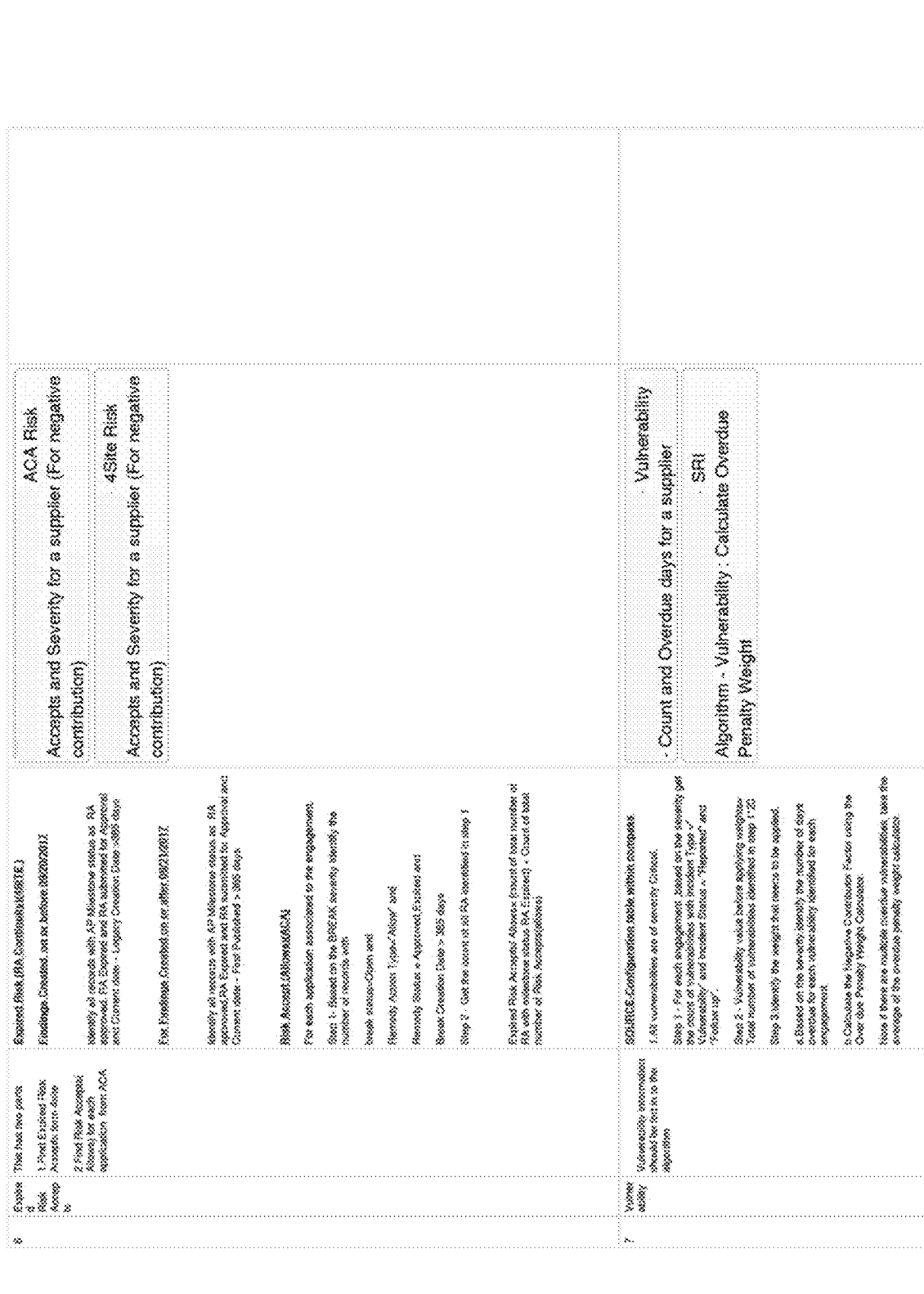

FIGS. 18A-18F depict an exemplary algorithm for determining an SRI in accordance with aspects of the embodiments described herein. As shown in FIG. 18A, the exemplary algorithm for determining an SRI includes as input parameters: dynamic control effectiveness (CE), an applications control assessment (ACA) score, performance score, expired risk accepts, vulnerability, incident, breach, data loss, overdue action plans, and overdue remedies. As shown in in FIG. 18A, the exemplary algorithm for determining an SRI includes determining an SRI for positive contributors as a summary of a performance score contribution, the ACA score, and the dynamic CE contribution. As shown in FIG. 18B, the aggregated dynamic CE score obtained is converted to value equivalent to the SRI range. As shown in FIG. 18C, the normalized legacy CE score is converted to an SRI equivalent value. As also shown in FIG. 18C, the converted aggregate performance scorecard value is fed directly into the SRI algorithm.

As shown FIG. 18D, the expired risk accepts form is obtained, and the risk accepts (allows) is obtained (or found) for each application from ACA. As also shown FIG. 18D, the vulnerability information is fed into the SRI algorithm. As shown in FIG. 18E, cyber incidents are fed into (or received by) the SRI algorithm based on type of cyber incident. As also shown in FIG. 18E, cyber breaches reported on engagements are fed into (or received by) the SRI algorithm. As further shown in FIG. 18E, data loss information is fed into (or received by) the SRI algorithm. As shown in FIG. 18F, action plan delays from 4 site are considered for SRI calculation. As also shown in FIG. 18F, application break remediation delays are calculated for each break associated to an application tied to an engagement. As shown in FIG. 18F, based on the various inputs, an SRI score for a particular supplier is calculated as a sum of the weighted positive contributors—(the negative contributor value*total number of overdue remedies).

Additionally, in embodiments, further logic may be applied to avoid double counting when evaluating parent suppliers. For example, in embodiments, all engagements may be grouped under Parent supplier including its own direct engagements as well. The corresponding Assessment Profiles may be obtained from the control assessment tool based on mapped engagements. For the assessment profiles based on the same logic used for Child Suppliers, the system is operable to obtain Dynamic CE scores for each Assessment profile. Also, the system is operable to obtain all of the corresponding Findings, Action Plans, Risk Accept etc. related to those assessment profiles. Also, in embodiments, each of the attributes is made unique, e.g., by: taking unique Dynamic CE for repeating assessment profiles; taking unique findings for duplicated findings based on ID; taking unique Action plan, risk accept, etc. for each of the mapped assessment profiles; obtaining other data like days overdue, finding creation date, etc. for each of the attributes; aggregating the unique DCE/ACA/Performance scores and use that as input for SRI positive contributor; using the unique action plan/RA/Finding/Vulnerability data as input for negative contributor; and running the streamlined data in SRI algorithm to provide Parent level SRI Dashboard.

Exemplary embodiments may comprise a user interface that is configured to receive instruction from a user. Such embodiments may also comprise a processor in communication with the user interface and software instructions that configure the processor to perform the steps of the disclosure described herein. Certain embodiments may also comprise storage which comprises information pertaining to one or more suppliers. Additionally, exemplary embodiments may comprise surveys and other data gathering devices that enable the collection of supplier information and characteristics.

While the present disclosure and associated inventive concepts have been illustrated by the description of various embodiments thereof, and while these embodiments have been described in considerable detail, it is not the intention of the Applicant to restrict or in any way limit the scope of any appended claims to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general inventive concepts.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of determining a supplier risk index (SRI) for a supplier, the method comprising:
   determining an inherent risk rating of the supplier based on risk attributes of the supplier;
   performing a control assessment of the supplier to determine a control assessment result;
   quantifying other risk attributes;
   calculating, by a processor, the SRI based on the inherent risk rating, the assessment result, and the other risk attributes, wherein the calculating the SRI comprises summing weighted positive contributors determined from the inherent risk rating and the control assessment result, and subtracting a product of a negative contributor value and a total number of overdue remedies, which are determined from the other risk attributes;
   receiving updated information for at least one of the inherent risk rating, the control assessment of the supplier, and other risk attributes;
   updating the SRI based on the updated information in real-time; and
   displaying the SRI along with additional supplier information in a supplier selection interface.

2. The method of claim 1, wherein the risk attributes comprise at least one of: a remote access attribute of the supplier; a sub line of business attribute of the supplier; a recovery time objective attribute of the supplier; a personal information/confidential information retention attribute of the supplier; a number of records of the supplier; a supplier-hosted application attribute of the supplier; a consumer/customer contact attribute of the supplier; a regulatory/compliance attribute of the supplier; and a difficulty of replacement attribute for the supplier.

3. The method of claim 1, wherein the control assessment comprises an assessment of a supplier with respect to at least one of:
   communications and connectivity controls and protocols of the supplier;
   a risk management program of the supplier;
   encryption policies of the supplier;
   authorization and authentication controls over data of the supplier;
   data integrity controls of the supplier;
   application controls of the supplier;
   business practices, policies, and procedures of the supplier; and
   management oversight of the supplier.

4. The method of claim 1, wherein the other risk attributes at the supplier comprise at least one of:
   a financial viability assessment (FVA) of the supplier;
   any negative news affecting the supplier;
   a concentration of risk assessment result of the supplier;
   a performance rating of the supplier;
   a vulnerability impact assessment result of the supplier; and
   a reporting of cyber incidents of the supplier.

5. The method of claim 1, wherein the displaying the SRI along with additional supplier information in a supplier selection interface comprises using a grading convention and color scheme based on the grading convention.

6. The method of claim 1, wherein the SRI is calculated as a numerical score.

7. A computing apparatus configured to implement an execution of a method for providing a real-time supplier risk index (SRI) and supplier selection criteria of at least one supplier in order to determine risk to an organization resulting from selection of the at least one supplier, the computing apparatus comprising:
   a processor;
   a memory;
   a display; and
   a communication interface coupled to each of the processor and the memory,
   wherein the processor is configured to:
      receive quantifications of a supplier's risk attributes, and determine the supplier's inherent risk rating based on the risk attributes of the supplier;
      receive quantifications of a control assessment result based on a performed control assessment of the supplier;
      receive quantifications of the other risk attributes;
      calculate the SRI based on the inherent risk rating, the assessment result, and the other risk attributes;
      receive updated information for at least one of the inherent risk rating, the control assessment of the supplier, and other risk attributes;
      update the SRI based on the updated information in real-time; and
   wherein the display is operable to provide a user interface displaying an SRI dashboard for the supplier indicating the SRI of the supplier in real-time along with additional supplier information in a supplier selection interface, and
   wherein calculating the SRI comprises summing weighted positive contributors determined from the inherent risk rating and the control assessment result, and subtracting a product of a negative contributor value and a total number of overdue remedies, which are determined from the other risk attributes.

8. The computing apparatus of claim 7, wherein the user interface additionally displays real-time control effectiveness information of the supplier based on the quantifications of a control assessment result.

9. The computing apparatus of claim 8, wherein the control effectiveness information includes a details selector for immediately displaying underlying supplier data used to determine the control assessment result.

10. The computing apparatus of claim 7, wherein the user interface additionally displays real-time performance information of the supplier based on historical performance data of the supplier.

11. The computing apparatus of claim 10, wherein the control effectiveness information includes a details selector for immediately displaying underlying supplier data used to determine the performance information.

12. The computing apparatus of claim 7, wherein the user interface additionally displays real-time cyber risk information of the supplier.

13. The computing apparatus of claim 12, wherein the cyber risk information includes a details selector for immediately displaying underlying data used to determine the cyber risk information.

14. The computing apparatus of claim 7, wherein the user interface displays a supplier SRI score along with additional supplier information for each of a plurality of suppliers for comparison of risk between the plurality of suppliers.

15. The computing apparatus of claim 7, wherein the user interface is a real-time dashboard for a supplier that indicates key supplier metrics.

16. The computing apparatus of claim 7, wherein the user interface additionally displays supplier contact information and management program membership information for the supplier.

17. A computing apparatus configured to implement an execution of a method for selecting a supplier based on real-time supplier risk index (SRI) and supplier selection criteria of at least one supplier, the computing apparatus comprising:
- a processor;
- a memory; and
- a communication interface coupled to each of the processor and the memory,
- wherein the processor is configured to:
    - provide a user interface on the communication interface having an SRI dashboard for the supplier indicating the real-time SRI of the supplier and having a supplier selector for selecting the supplier,
    - receive updated information for at least one of the inherent risk rating, the control assessment of the supplier, and other risk attributes; and
    - update the SRI based on the updated information in real-time; and
- wherein the communication interface is configured to display the SRI along with additional supplier information in a supplier selection interface, and
- wherein the processer is further operable to receive a user selection of the supplier via the supplier selector,
- wherein the SRI is determined based on:
    - received quantifications of risk attributes of a supplier;
    - received quantifications of a control assessment result of the supplier; and
    - received quantifications of other risk attributes of the supplier, and
- wherein the determining the SRI comprises summing weighted positive contributors determined from the inherent risk rating and the control assessment result, and subtracting a product of a negative contributor value and a total number of overdue remedies, which are determined from the other risk attributes.

* * * * *